(12) United States Patent
Gavarini

(10) Patent No.: US 8,195,520 B1
(45) Date of Patent: *Jun. 5, 2012

(54) MESSAGE AUDIT TRAIL FEATURE FOR FACILITATING ELECTRONIC TRANSACTIONS

(75) Inventor: Paul Marie Pierre Gavarini, Los Altos, CA (US)

(73) Assignee: Amazon Technologies, Inc., Reno, NV (US)

( * ) Notice: Subject to any disclaimer, the term of this patent is extended or adjusted under 35 U.S.C. 154(b) by 21 days.

This patent is subject to a terminal disclaimer.

(21) Appl. No.: 12/831,202

(22) Filed: Jul. 6, 2010

Related U.S. Application Data

(62) Division of application No. 11/380,628, filed on Apr. 27, 2006, now Pat. No. 7,752,079, which is a division of application No. 09/607,841, filed on Jun. 30, 2000, now Pat. No. 7,080,070.

(60) Provisional application No. 60/142,287, filed on Jul. 2, 1999.

(51) Int. Cl.
*G06Q 30/00* (2006.01)

(52) U.S. Cl. ..................... 705/26.1; 705/27.1

(58) Field of Classification Search ......... 705/26.1–27.2
See application file for complete search history.

(56) References Cited

U.S. PATENT DOCUMENTS

| | | |
|---|---|---|
| 4,885,694 A | 12/1989 | Pray et al. |
| 5,319,542 A | 6/1994 | King, Jr. et al. |
| 5,592,375 A | 1/1997 | Salmon et al. |
| 5,727,164 A | 3/1998 | Kaye et al. |
| 5,745,681 A | 4/1998 | Levine et al. |
| 5,758,328 A | 5/1998 | Giovannoli |
| 5,794,233 A | 8/1998 | Rubinstein |
| 5,799,284 A | 8/1998 | Bourquin |
| 5,864,845 A | 1/1999 | Voorhees et al. |
| 5,870,717 A | 2/1999 | Wiecha |
| 5,890,175 A | 3/1999 | Wong et al. |
| 5,893,889 A | 4/1999 | Harrington |
| 5,895,454 A | 4/1999 | Harrington |
| 5,897,622 A | 4/1999 | Blinn et al. |
| 5,905,973 A | 5/1999 | Yonezawa et al. |
| 5,911,140 A | 6/1999 | Tukey et al. |
| 5,913,215 A | 6/1999 | Rubinstein et al. |
| 5,950,214 A | 9/1999 | Rivette et al. |
| 5,960,411 A | 9/1999 | Hartman et al. |

(Continued)

OTHER PUBLICATIONS

"Electronic commerce: Using clickwrap agreements." Jerry C. Liu; Robert J O'Connell; W.Scott Petty. The Computer Lawyer: Dec 1998; 15, 12; ABI/INFORM Global. p. 10. Retrieved via Proquest on Feb. 1, 2012.*

(Continued)

*Primary Examiner* — Michael Misiaszek
(74) *Attorney, Agent, or Firm* — Knobbe Martens Olson & Bear LLP

(57) ABSTRACT

An electronic commerce system provides various features for assisting customers in locating items and generating orders from a merchant's electronic catalog, and for assisting customers and merchants in communicating about such orders. A user-definable categories feature allows customers and/or merchants to define search queries for searching the electronic catalog, and to store these search queries under user-defined category names for subsequent use. An "active quote" feature allows the customer to view and modify quantities of items selected for prospective purchase throughout various catalog browsing or viewing modes. A message audit trail feature allows a customer and a merchant to send messages to one another that are linked to a particular order, and to view an order-specific log of such messages.

14 Claims, 30 Drawing Sheets

U.S. PATENT DOCUMENTS

| | | |
|---|---|---|
| 5,966,697 A | 10/1999 | Fergerson et al. |
| 5,970,471 A | 10/1999 | Hill |
| 6,006,225 A | 12/1999 | Bowman et al. |
| 6,032,145 A | 2/2000 | Beall et al. |
| 6,055,516 A | 4/2000 | Johnson et al. |
| 6,055,573 A | 4/2000 | Gardenswartz et al. |
| 6,169,986 B1 | 1/2001 | Bowman et al. |
| 6,253,188 B1 | 6/2001 | Witek et al. |
| 6,298,348 B1 | 10/2001 | Eldering |
| 6,317,782 B1 | 11/2001 | Himmel et al. |
| 6,324,536 B1 | 11/2001 | Rofrano |
| 6,324,538 B1 | 11/2001 | Wesinger et al. |
| 6,331,858 B2 | 12/2001 | Fisher |
| 6,332,135 B1 | 12/2001 | Conklin et al. |
| 6,336,105 B1 | 1/2002 | Conklin et al. |
| 6,338,050 B1 | 1/2002 | Conklin et al. |
| 6,338,066 B1 | 1/2002 | Martin et al. |
| 6,356,905 B1 | 3/2002 | Gershman et al. |
| 6,460,034 B1 | 10/2002 | Wical |
| 6,484,162 B1 | 11/2002 | Edlund et al. |
| 6,502,113 B1 | 12/2002 | Crawford et al. |
| 6,519,571 B1 | 2/2003 | Guheen et al. |
| 6,529,952 B1 | 3/2003 | Blumenau |
| 6,594,692 B1 | 7/2003 | Reisman |
| 6,721,713 B1 | 4/2004 | Guheen et al. |
| 6,769,019 B2 | 7/2004 | Ferguson |
| 6,922,672 B1 | 7/2005 | Hailpern et al. |
| 7,167,844 B1 | 1/2007 | Leong et al. |
| 2003/0115151 A1 | 6/2003 | Wheeler et al. |
| 2004/0107158 A1 | 6/2004 | Odom et al. |

OTHER PUBLICATIONS

Borgman et al., Rethinking Online Monitoring Methods for Information Retrieval Systems: From Search Product to Search Process, Journal of the American Society for Information Science, retrieved from ProQuest Dec. 4, 2009, Jul. 1996.

Dialog Lab Workbook & Reference manual, Dialog Information Services, Inc., 1988 Classroom Instruction Program, front and back cover and pp. 6-1 to 6-18, Sep. 1988.

Gauvin, References To Go, Ecocontent, Oct. 11, 1999.

Liu et al., Electronic Commerce: Using Clickwrap Agreements, The Computer Lawyer, retrieved via ProQuest, Dec. 1998, vol. 15, Issue 12, pp. 10, Englewood Cliffs, United States.

Wiggins, Plateaus, Peaks, and Promises, The Infonortis '98 Search Engines Conference, Jun. 1998.

Wiley, Cited References on the Web: A Review of ISI's Web of Science, Searcher, Jan. 1998.

* cited by examiner

FIG. 4

Adventures in Wine

Full Catalog: (964 Products)

| Product ID | Product Name | Stock Status | Unit | Unit Price | Quantity |
|---|---|---|---|---|---|
| ABEAU-BRUT 1991-12750 | 1991 Brut Grand Cru "Ambonnay" A Beaufort | Out of Stock | Bottle | $23.33 | 0 |
| ABEAU-BRUT 1991-12750 | 1991 Brut Grand Cru "Ambonnay" A Beaufort | In Stock | Case | $280.00 | 0 |
| ACHAI-DANIE-NV-12750 | NV Achaia Clauss Danielis Red: Achai Clauss | In Stock | Case | $48.00 | 0 |
| ACHAI-DANIE-NV-12750 | NV Achaia Clauss Danielis Red: Achai Clauss | In Stock | Bottle | $4.00 | 0 |
| ACHAI-HELEN-NV-12750 | NV Achaia Clauss St. Helena | Out of Stock | Case | $60.00 | 0 |
| ACHAI-HELEN-NV-12750 | NV Achaia Clauss St. Helena | In Stock | Bottle | $5.00 | 0 |
| AFGRO-CH-1996-12750 | 1996 Hautes Cotes Nuitis: A.F. Gros | In Stock | Case | $360.00 | 0 |
| AFGRO-HCN-1996-12750 | 1996 Hautes Cotes Nuitis: A.F. Gros | Out of Stock | Case | $180.00 | 0 |

Sidebar:
- CATALOG
  - Browse
  - Search
  - Categories
- QUOTES
  - Active
  - New
  - Save
  - Retrieve
- ORDERS
  - Last
  - Retrieve
  - Statistics
  - Track
- ADMIN
  - Buyers
- MAIL
  - New Mail
  - Old Mail
  - Send Mail
- USER
  - Preferences
  - Help
  - Sign-Off Next Products    Update your Active Quote

MERCHANT ADMINISTRATIVE FUNCTIONS

CLIENTS
 SELECT

APPLICATIONS
 SELECT
 WAITING

ORDERS
 NEW
 ALL
 TRACK

STATISTICS
 SELECT
 PER MONTH
 PER YEAR
 PER CLIENT
 PER STATE

SERVICES
 NEW MAIL
 OLD MAIL
 SEND MAIL
 CATALOG

SEARCH
 PRODUCTS
 ORDERS
 EVERYTHING

COMPANY
 PERSONNEL
 PREFERENCES
 HELP
 SIGN OFF

ORDER DETAILS

| | | | |
|---|---|---|---|
| CLIENT | Sandi Belcher | ORDER NAME | ORDER 06/12/99 |
| CLIENT CODE | BELCH | DATE PLACED | 06/12/99 |

| | SHIP TO: | BILL TO: |
|---|---|---|
| COMPANY | Sandi Belcher | Sandi Belcher |
| NAME | Harry, Bigbucks | Harry, Bigbucks |
| ADDRESS | Box 50 | Box 50 |
| | St. Helena, CA 94574 | St. Helena, CA 94574 |
| | UNITED STATES | UNITED STATES |
| EMAIL | harry@superliquor.com | harry@superliquor.com |
| PHONE | 707.963.2496 | 707.963.2496 |
| FAX | 707.963.3429 | 707.963.3429 |

| PRODUCT CODE | PRODUCT NAME | QUAN | STOCK | UNIT | PRICE | ITEM TOTAL |
|---|---|---|---|---|---|---|
| ACHAI-HELEN-NV-12/750 NV | Achaia Clauss St. Helena | 7 | 6 | CASE | 60.00 | 420.00 |
| | | | | | UNADJUSTED TOTAL | 420.00 |
| | | | | ADJUCTMENT TO FINAL TOTAL COST | | 420.00 |
| | | | | | FINAL TOTAL | 420.00 |

*215* — LAST INSTRUCTIONS FROM THE CLIENT: I NEED THIS FAST!

[HISTORY] *219*

MESSAGE FROM: Aiw
*217*

CARRIER: [UPS]   TRACKING NUMBER: [1zw248x12210553279]   SHIPPING DATE MM/DD/YYYY: [ ]   [DISPLAY TRACKING DETAILS]

STATUS: [ACCEPTED]  *211*   [UPDATE THEN VIEW NEXT]  *213*

*FIG. 25A*

MESSAGE AUDIT TRAIL FEATURE FOR FACILITATING ELECTRONIC TRANSACTIONS

CROSS-REFERENCE TO RELATED APPLICATIONS

This application is a divisional U.S. patent application Ser. No. 11/380,628, entitled SYSTEM AND METHOD FOR GENERATING AND DISPLAYING MESSAGES ASSOCIATED WITH NEGOTIATED ORDERS, and filed on Apr. 27, 2006, now U.S. Pat. No. 7,752,079, which is a divisional of U.S. patent application Ser. No. 09/607,841, entitled SYSTEM AND METHODS FOR BROWSING A DATABASE OF ITEMS AND CONDUCTING ASSOCIATED TRANSACTIONS, and filed on Jun. 30, 2000, now U.S. Pat. No. 7,080,070, which claims the benefit of U.S. Provisional Patent Application No. 60/142,287, entitled SYSTEM AND METHODS FOR FACILITATING BUSINESS-TO-BUSINESS ELECTRONIC COMMERCE, and filed on Jul. 2, 1999.

BACKGROUND OF THE INVENTION

In the field of Internet commerce, there are two major classifications of transactions. The first classification is business-to-consumer commerce, which typically involves a business selling its products or services to consumers over the Internet or other computer network. The other classification of electronic commerce is business-to-business commerce, which involves transactions between businesses.

Business-to-business electronic commerce transactions typically differ from business-to-consumer transactions in several significant respects. For example, in business-to-business transactions involving the sale of goods, it is common for a buyer to place orders periodically (e.g., once per month) for the same or a similar set of goods. In addition, each such order typically encompasses many different items, and relatively large quantities of such items. Further, in the course of a business-to-business transaction, it is common for the buyer and the seller to communicate with each other about the transaction.

It would be desirable to provide an electronic commerce system which accommodates these and other characteristics of business-to-business commerce.

SUMMARY OF THE DISCLOSURE

An electronic commerce system provides various features for assisting customers in locating items and generating orders from a merchant's electronic catalog, and for assisting customers and merchants in communicating about such orders. A user-definable categories feature allows customers and/or merchants to define search queries for searching the electronic catalog, and to store these search queries under user-defined category names for subsequent use. Categories created by the merchant through this method are made available (e.g., presented as hyperlinks on a "categories" page) to all customers of the merchant, while categories created by customers are made available as personal categories for the respective customers (e.g., presented as additional hyperlinks on the categories page).

An "active quote" feature allows the customer to view and modify quantities of items selected for prospective purchase throughout the various browsing or viewing modes. Specifically, regardless of the browsing mode (alphabetic browsing, category-based browsing, search, etc.), whenever the user views an item or a list of items, each such item is displayed in conjunction with a "quantity" field which indicates the number of that item currently selected for purchase. Thus, when the user views an item, the user can immediately determine whether the item is selected for purchase (and its quantity) without having to access a shopping cart page or other special page.

A message audit trail feature allows a customer and a merchant to send messages to one another that are linked to a particular order, and to view an order-specific log of such messages. This feature may, for example, be used to facilitate negotiations between the customer and the merchant in connection with an order placed by the customer.

BRIEF DESCRIPTION OF THE DRAWINGS

FIGS. 4-13 show "screen capture" depictions of an electronic commerce application using a dynamic selected-item tracking system.

FIG. 25A illustrates a "screen capture" depiction of an electronic commerce system utilizing a messaging system between a merchant and a customer, wherein the message is linked to an order page.

FIGS. 27 and 27A show process flow diagrams of a dynamic user-defined category feature.

DETAILED DESCRIPTION OF THE PREFERRED EMBODIMENT

Figure 1:
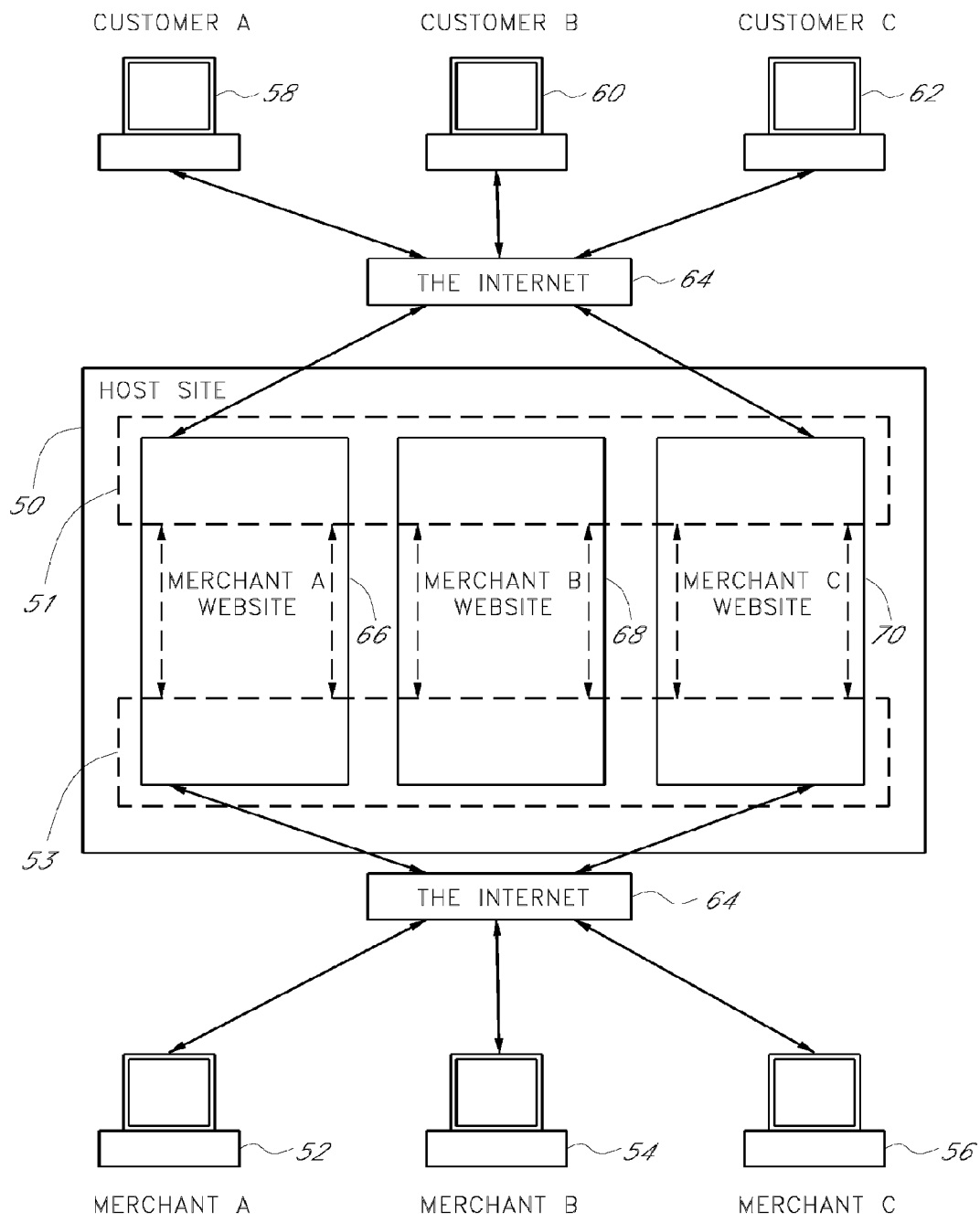
FIG. 1 shows a schematic diagram of an electronic commerce site hosting multiple merchant web sites.

Throughout the following description, the term "web site" is used to refer to a user-accessible network site that implements the basic World Wide Web standards for the coding and transmission of hypertextual documents. These standards currently include HTML (the hypertext mark up language) and HTTP (the hypertext transfer protocol). It should be understood that the term "site" is not intended to imply a single geographic location as a web or other network site can, for example, include multiple geographically distributed computer systems that are appropriately linked together.

The present invention provides various inventive features for assisting customers in locating items and generating orders from a merchant's electronic catalog, and for assisting customers and merchants in communicating about such orders. These features are preferably embodied within a business-to-business electronic commerce system, but could alternatively be embodied in within a business-to-consumer or other type of electronic commerce system.

One important feature of the electronic commerce system involves the ability of customers and/or merchants to define categories for browsing the merchant's catalog. The categories are preferably defined using user-specified search queries. In a preferred embodiment, both the merchant and the merchant's customers are presented the option of applying a search query to the electronic catalog, and then saving the query under a user-specified category name for subsequent use. Categories created by the merchant through this method are made available (presented as hyperlinks on a "categories" page) to all customers of the merchant. Categories created by customers through this method are made available as personal categories (preferably presented as additional hyperlinks on the categories page) for the respective customers. When a category is selected for viewing, the corresponding query is applied to the merchant's database and the results presented to the user. Thus, any item additions by the merchant are automatically incorporated into the preexisting categories.

Another important feature of the invention involves allowing the customer to view and modify quantities of items selected for prospective purchase throughout the various browsing or viewing modes. Specifically, regardless of the browsing mode (alphabetic browsing, category-based browsing, search, etc.), whenever the user views an item or a list of items, each such item is displayed in conjunction with a "quantity" field which indicates the number of that item currently selected for purchase. Thus, when the user views an item, the user can immediately determine whether the item is selected for purchase (and its quantity) without having to access a shopping cart page or other special page. Further, in the preferred embodiment, the user can edit the quantity values within such fields to directly modify the item quantities selected for prospective purchase. This feature is particularly useful for merchants that commonly place orders for large numbers of different items, although the feature may also be used for business-to-consumer commerce.

Another important feature of the present invention involves the ability for a customer and a merchant to send messages to one another that are linked to a particular order, and to view an order-specific log of such messages. This feature is particularly useful for companies that have a need to communicate with each other about an order (e.g., negotiate delivery terms) during the order's pendency.

For the sake of simplicity, the drawings show screens (web pages) with relatively few items and quantities selected for prospective purchase; however, the advantages of the present invention become more fully apparent when the transaction includes large quantities of many different items, as do many business-to-business transactions.

The drawings show the electronic commerce system of the present invention implemented using the World Wide Web. However, those skilled in the art will recognize that the present invention could also be implemented in other fashions. For instance, the electronic commerce system of the present invention could be implemented using standard Internet and World Wide Web protocols through other commercial on-line providers, such as America Online, or through a private hosting service or network. Alternatively, the electronic commerce system of the present invention could be implemented using proprietary protocols over either a public or private network, or could be implemented entirely within a single computing facility. In addition, although the electronic commerce system disclosed herein embodies several different inventive features, it will be recognized that any one of these features could be implemented with out the others. Further, although the inventive features are described in the context of the sale of products, it will be recognized that the features could be used to facilitate transactions involving other types of items, such as securities, livestock, and various types of services.

FIG. 1 shows an electronic commerce site 50 whereby a plurality of merchants 52, 54, 56 can do business with a plurality of customers 58, 60, 62 using the Internet 64 or some other network as a common communications medium. In this embodiment of the present invention, each merchant 52, 54, 56 has a separate web site 66, 68, 70, respectively, all of which are hosted and maintained by the host site 50. The host site runs an electronic commerce application, comprising a customer application 51 (shown in phantom) and a merchant application 53 (shown in phantom), which provide electronic commerce facilities for customers 58, 60, 62 and merchants 52, 54, 56, respectively. (The term "application" is used herein to refer collectively to executable code and associated web page components.) For example, when Customer A 58 wants to do business with Merchant A 52, Customer A can access the customer application 51 on Merchant A's web site 66. In turn, Merchant A 52 can access the merchant application 53 to complete the transaction with customer A 58. The host site is preferably operated by a third-party entity which charges the merchant a flat transaction fee for each order placed by a customer. In one embodiment, the merchants pay the third party entity in advance, for example, "pre-purchasing" one thousand transactions. Note that both the customer application 51 and the merchant application 53 may comprise either a suite of application programs or a single, integrated application program. In addition, both the merchant application 53 and the customer application 51 could be embodied in a single application program, or could be two separate application programs, running on one or more World Wide Web servers.

In addition to hosting the web sites for the merchants, the host site 50 also provides tools for allowing the merchant to manage and administer its own site through the merchant application 53. In this way, a merchant can easily maintain an on-line presence without bearing the cost or the inconvenience of maintaining its own independent web site. Alternatively, the customer application 51 and the merchant application 53 could be set up and maintained by the merchant itself without the assistance of a third-party host site.

Figure 2:
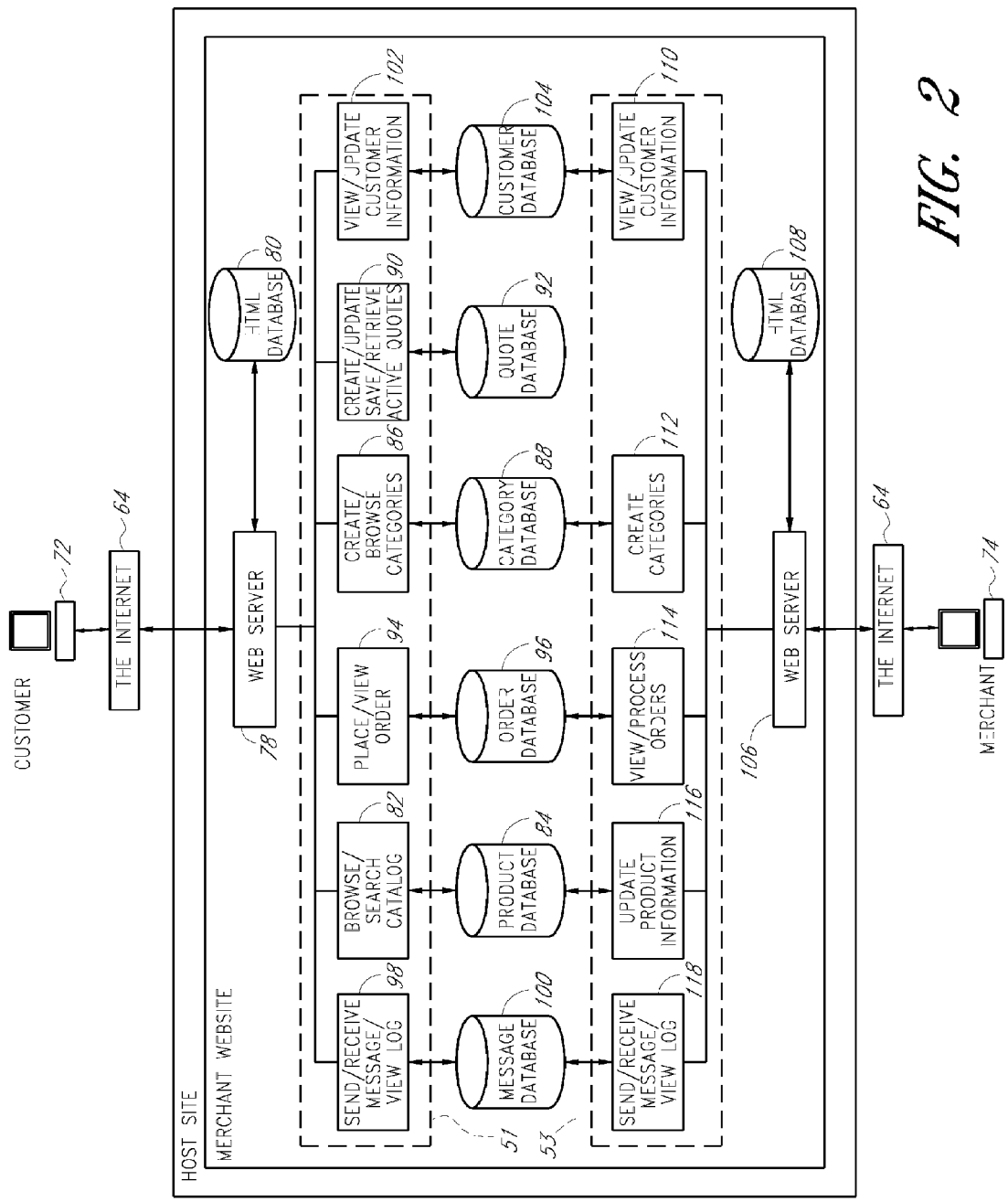
FIG. 2 shows a schematic diagram of an electronic commerce site providing multiple services to merchants and customers.

FIG. 2 shows a preferred architecture of the electronic commerce system. In this embodiment, the customer 72 and the merchant 74 both access the merchant web site 76 through the Internet 64. The merchant web site 76 is hosted and maintained by the host site 50 and contains a variety of applications which enhance the functionality of the transaction between the customer 72 and the merchant 74. Upon accessing the merchant web site 76, the customer 72 logs onto the site through the web server 78, which provides to the user HTML pages and forms retrieved from the HTML database 80.

After logging onto the web server 78, the customer 72 has access, through the customer application 51 to a variety of functions with which to transact electronic commerce. For instance, the customer 72 can choose to browse or search a product catalog 82, which the web server 78 retrieves from the product database 84. The product database 84 contains descriptions of the products, as well as information about the pricing and availability of the products. The product database 84 may also include a picture database (not shown), which contains pictures of some or all of the products in the product database.

Alternatively, the customer 72 can create new product categories or browse existing categories 86, which the web server 78 stores in and retrieves from the category database 88. The category database 88 contains product categorization information, both for merchant-created and customer-created categories.

As noted above, the customer 72 can keep track of the items selected for prospective purchase and the quantity of each item selected through the dynamic item-selection tracking system 90 (also referred to as the "Active Quote" system). The dynamic selected-item tracking system 90 can store and retrieve information about items selected for prospective purchase in the present transaction or past transactions through the quote database 92. The quote database 92 maintains a record of "quotes" generated by the customer 72, where each quote includes a set of items and item quantities selected for prospective purchase. A quote is referred to as "active" when it is being accessed by the customer in a form in which the selected items and quantities can be modified. The quotes stored in the quote database 92 may include quotes from past transactions. In an alternative implementation, the quote database might also contain other information about the items selected for prospective purchase in a given transaction, for instance the price of the items on the date the items were selected for prospective purchase.

The customer 72 can also place new orders or view past orders 94, each of which is stored in and retrieved from the order database 96. In addition, the customer 72 can use the customer application 51 to view information about the status of the order, retrieved from the order database 96. The order database 96 maintains a record of each order, including the items ordered and the status of each order.

The customer can send a message to or receive a message from 98 the merchant 74, the message to be stored in the message database 100. The customer 72 can also view a history (or "message audit trail") 98 of all messages for a particular order. The message database 100 records and stores all correspondence between customers and merchants and links the messages that relate to a particular order to facilitate the generation of the message audit trail.

Finally, the customer 72 can view or update its respective customer information 102, retrieved from the customer database 104. The customer database 104 contains all of the information about a merchant's customers, including the customer's biographical information, order history, payment status and credit terms. Note that the discussion of database structure and function in the preceding discussion is meant for illustrative purposes only and is in no way intended to limit the scope of the claims.

Under the present embodiment, the merchant 74 accesses its web site 76 in a similar fashion to the customer 72, by logging onto a web server 106, which retrieves HTML and forms from an HTML database 108. However, upon logging on to the web server 106, the merchant 74 enters the merchant application 53, which presents a different set of options 110, 112, 114, 116 and 118 from the options 82, 86, 90, 94, 98, 102 presented by the customer application 51. For instance, the merchant 74 can view and process orders 114 obtained from the order database 96. The merchant 74 can also update the status of an order, for instance by checking boxes to indicate that the order has been accepted, declined, completed, etc.

In addition, the merchant 74 can create categories 112 to be stored in the category database 88 and retrieved when the customer 72 browses categories 86. The merchant 74 can also update product information 116 in the product database 84 or view and update customer information 110 in the customer database 104. Finally, the merchant 74 can send or receive messages or view a message audit trail 118 for a particular order or a particular customer, stored in the message database 100. Those skilled in the art will recognize that a variety of other functions, administrative and otherwise, can also be accomplished by both the customer 72 and the merchant 74 through the customer 51 and merchant 53 applications, respectively.

Figure 3:
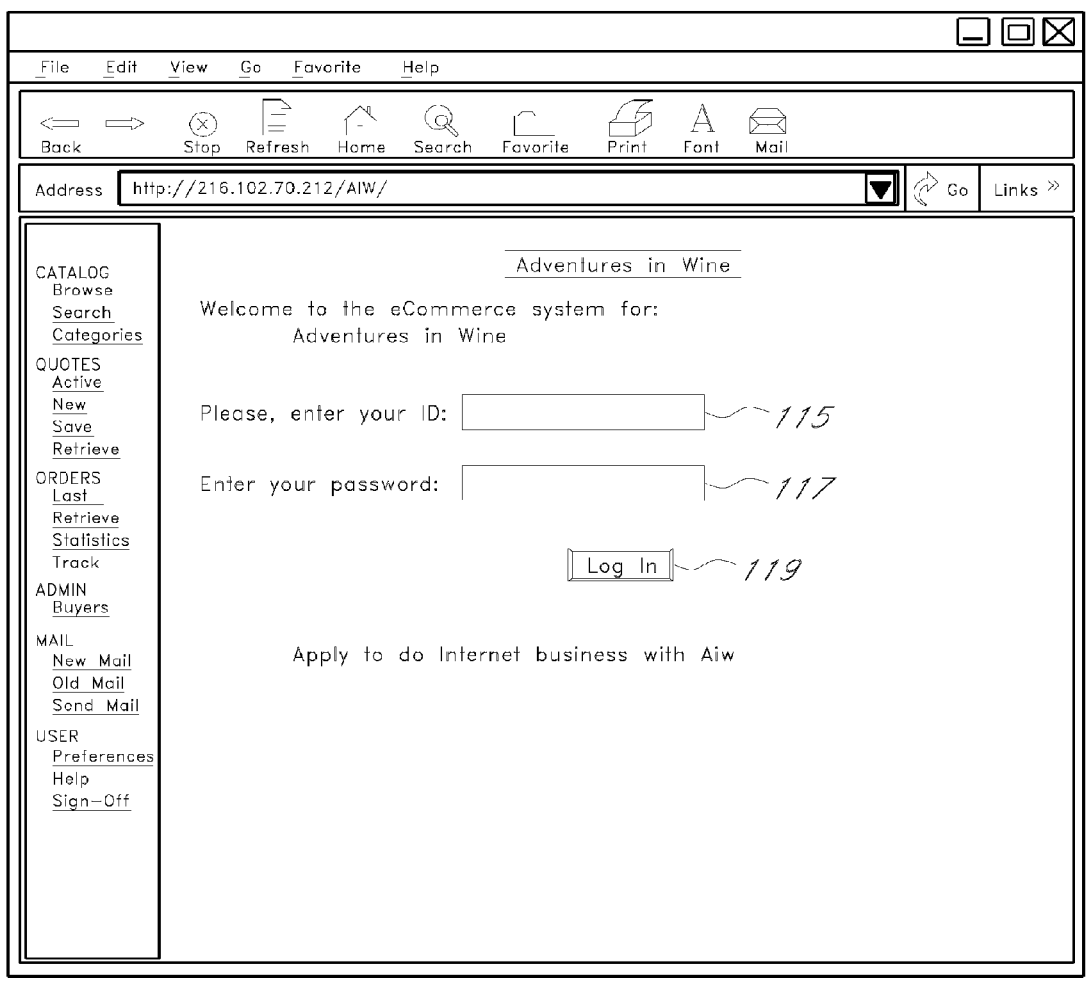
FIG. 3 shows a "screen capture" depiction of a merchant web site login screen.

FIG. 3 shows an example World Wide Web log in screen that may be used by both a merchant and a customer for accessing the merchant's site. The screen contains fields for a user I.D. 115 and a password 117, as well as a button labeled "Log In" 119. Under the preferred embodiment, each merchant has a separate Internet domain and log in site. However, in an alternative implementation, multiple merchants could share an Internet domain and login site, with the system differentiating the merchants, and their respective customers, by the log in ID provided.

Under the preferred embodiment, both the customer and the merchant log in to the electronic commerce system through the same web page, at which point the web server 78, 106 displays a page which corresponds to either the customer application 51 or the merchant application 53, depending on the user I.D. provided. However, those skilled in the art can see how the system could easily be implemented with different log in procedures for both merchants and customers. For instance, in one embodiment, the customer 72 access the customer application 51 through the World Wide Web, while the merchant 74 might instead use a dedicated software client or some other method to access the merchant applications 53. Similarly, the customer 72 might also use a dedicated software application or other method to access the customer application 51. Alternatively, both customer 72 and merchant 74 might both use the World Wide Web to access the customer interface 51 and merchant interface, respectively, but each might access a different web site to interact with their respective applications.

FIG. 4 shows a "screen capture" of an example web page from the customer application 51 of the preferred embodiment of the present invention. The web page includes a navigation bar 119, which maintains hyperlinks to common electronic commerce functions, including other methods for browsing and searching the product catalog, as well as administrative functions. The example web page depicted in FIG. 4 shows a screen encountered while browsing 82 the product database 84. As such, the example web page contains product listings, for example, the product listing 120, as well as dynamically updated quantity information for each product, for example, the quantity 122 for the product listing 120. The example web page also contains navigational buttons, for example, the "Next Products" button 123, which allow the customer 72 to navigate through the entire product catalog.

The customer application 51 of the current embodiment embraces four methods of viewing the product catalog. The first three of these methods enable the customer 72 to locate products in the catalog. The first method of viewing the product catalog is simply through browsing the product database 84 (by clicking on the "Browse" link in the navigation bar 119), which allows the customer 72 to view all of the products in the product database 84, arranged in sequential (alphabetical) order. The second method of viewing the product catalog (which may be accessed by clicking on the "Search" link in the navigation bar 119) utilizes the search engine capabilities of the customer application 51 to quickly view all products in the product database 84 which satisfy a customer-supplied query. The third method of viewing the product catalog is to use the categories feature of the database, which described in detail below and is accessed by clicking on the "categories" link on the navigation bar 119.

Figure 3A:
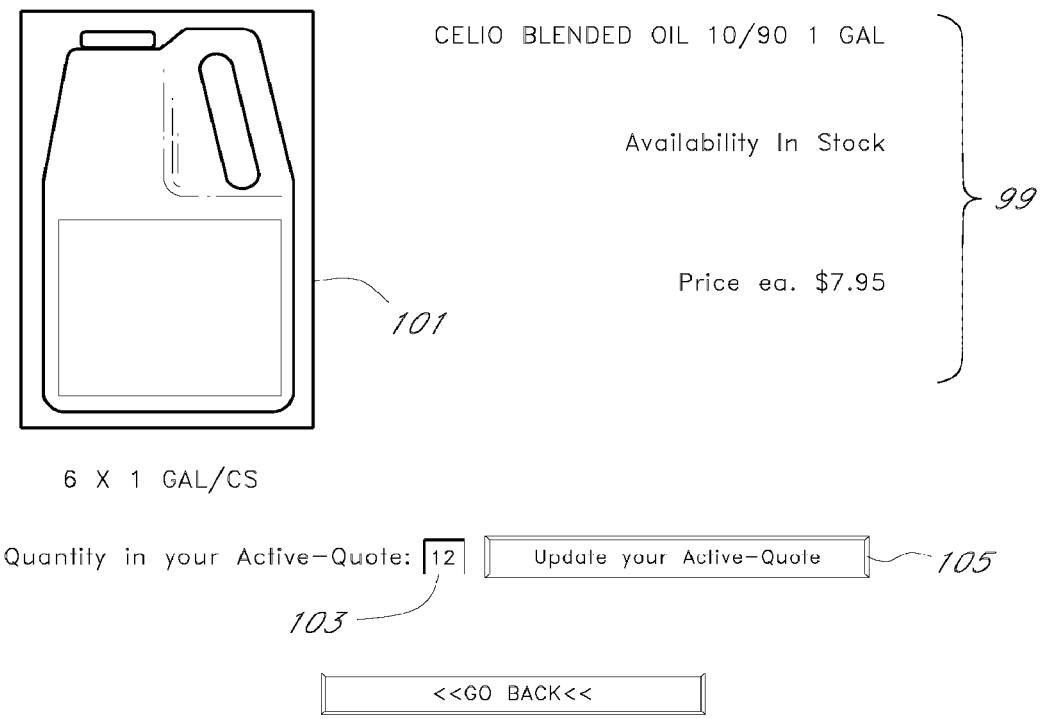
FIG. 3A shows a "screen capture" depiction of a detailed product description and picture, utilizing a product information and picture template.

The fourth method of examining products in the product database 84 is viewing a detailed description and picture of a product, using a product information and picture templates. Whenever the customer application 51 displays a listing of products in one of the three methods described above, the product listing contains a hyperlink to a detailed description of the product, along with an optional picture. FIG. 3A illustrates an example screen display showing a detailed description 99 and picture 101 of the product. The arrangement of these elements 99, 101 is governed by a product information and picture template, which allows the merchant 74 to control how the elements will appear to the customer 72, by designing the layout with ordinary HTML (or alternatively, other online display tools). In this way, the merchant 74 can deal with relatively easy-to-use design tools and need not interface directly with the product database 84 to generate the display of a detailed description and picture of a product. One benefit of this feature is the ability for the merchant 74 to create a relatively large number of product information and picture templates and assign different products to different templates. This feature provides to the merchant the power of displaying different products in different formats, yet still allows the merchant to design the formats using relatively simple tools.

Figure 6:
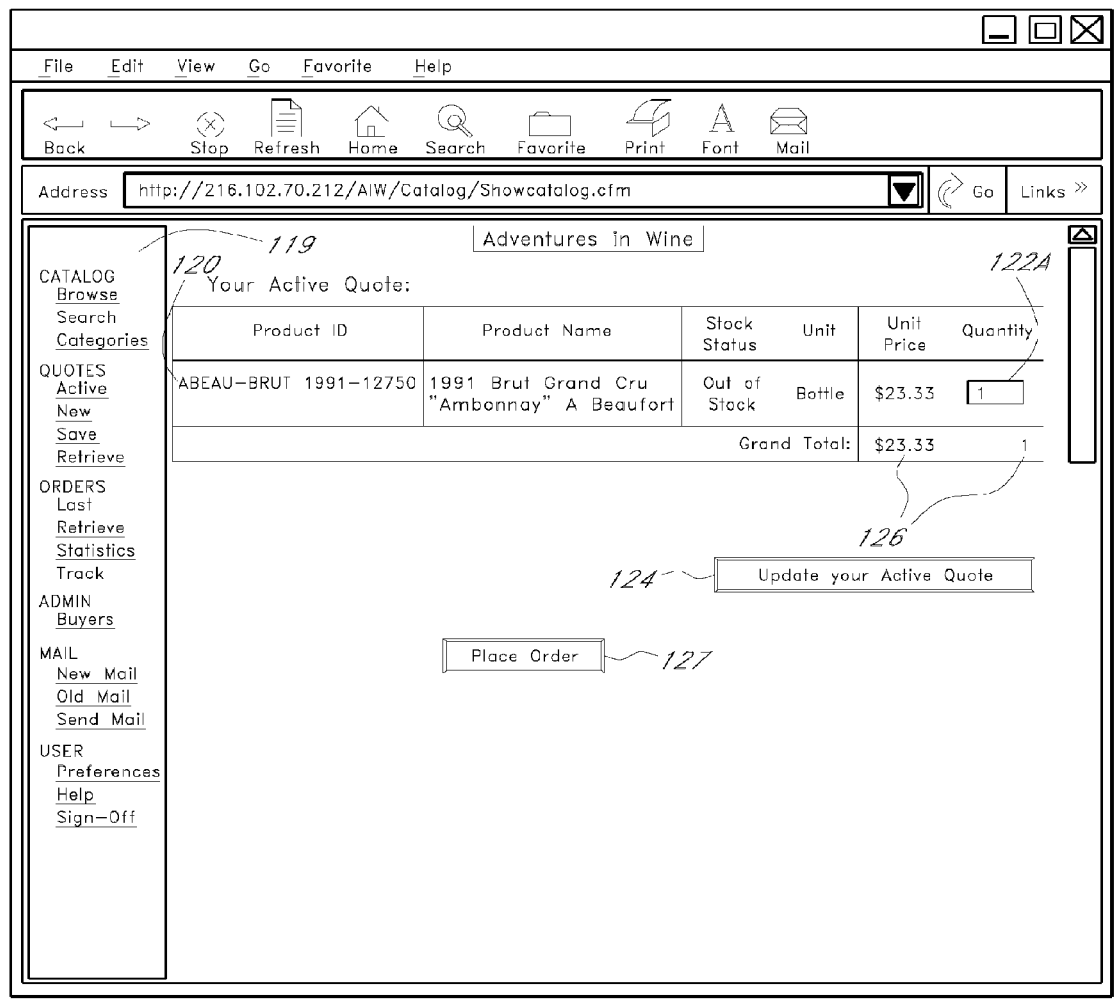

Other implementations might contain other methods of viewing the merchant's catalog, for instance, an index of products wherein each entry in the index is a hyperlink which links to the respective product's listing in the catalog, or using traditional, non-dynamic categories to classify products and viewing products in those categories. In addition, an implementation might include "personal recommendations," whereby products are recommended to a specific customer, based on that customer's past purchasing habits. However, regardless of the method used to view products, the customer application 51 allows the customer 72 to immediately view and modify quantity information for any of the items shown in the view, using the Active Quote system, discussed below. For instance, referring ahead to FIG. 18, which illustrates a screen produced by the customer application 51, during viewing in the "categories" mode, the quantity information (collectively referred to as 192) for the items shown on the screen (collectively referred to as 190) can be viewed and modified without having to visit a separate screen or form. Similarly, FIG. 3A illustrates a screen produced by the customer application 51, showing a detailed description 99 and picture 101 of a product, using product information and picture templates (described above). This display also allows the customer 72 to view and modify quantity information for the item displayed, using the currently-selected quantity field 103 and the "Update Active Quote" button 105. As illustrated by these and other example screen displays, whenever the customer views a product—whether in one of the three catalog-viewing modes (browsing, searching, or categories), within a product detail page, or during viewing of the Active Quote page (FIG. 6)—the item is displayed together with a field which indicates, and allows the customer 72 to modify, the quantity of that product currently selected for prospective purchase.

Figure 5:
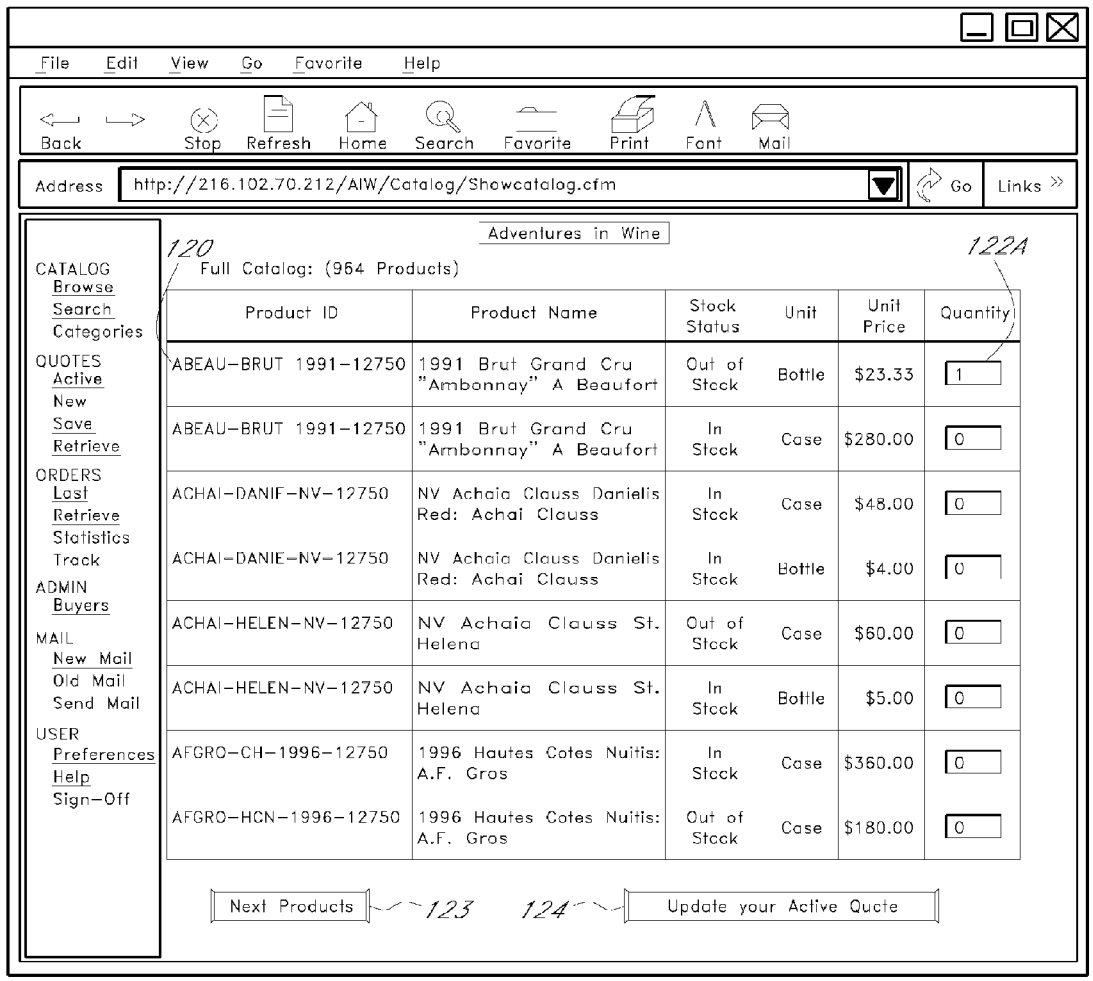

The example web page also contains a button 124 which enables the customer 72 to utilize the dynamic selected-item tracking feature of the present invention to dynamically update the quantity information 122 for each product 120. Referring to FIG. 5, if the customer 72 updates the quantity field 122A for one of the products 120 and presses the button 124, the customer application 51 updates the entry in the quote database 92 for the selected item 120 with the new quantity 122A. In addition, the customer application 51 uses the Active Quote information for all selected items to calculate a new grand total amount 126 for both price and quantity of all selected items. The customer application 51 displays this information on the Active Quote page, depicted by FIG. 6, which displays all of the item and quantity information for the Active Quote. In an alternative embodiment, the customer application 51 might update the Active Quote in the quote database 92 without automatically displaying to the user the contents of the current Active Quote. The Active Quote page can also be accessed from by selecting the "Active" link from the navigation bar 119 on any page.

The Active Quote page (FIG. 6) shows all selected items 120 currently tracked by the customer application 51, along with their respective, dynamically updated quantities 122A. Once again, the customer 72 has the option to update the Active Quote using the button 124 (this would be done, for example, if the customer had updated the quantity 122A for the product 120 since last pressing the "Update Active Quote" button 124). In addition, the customer 72 has the option at this point to place the order for all of the selected items 120 using the button 127. Finally, the user can continue to browse or search the catalog using the navigation bar 119.

Figure 7:
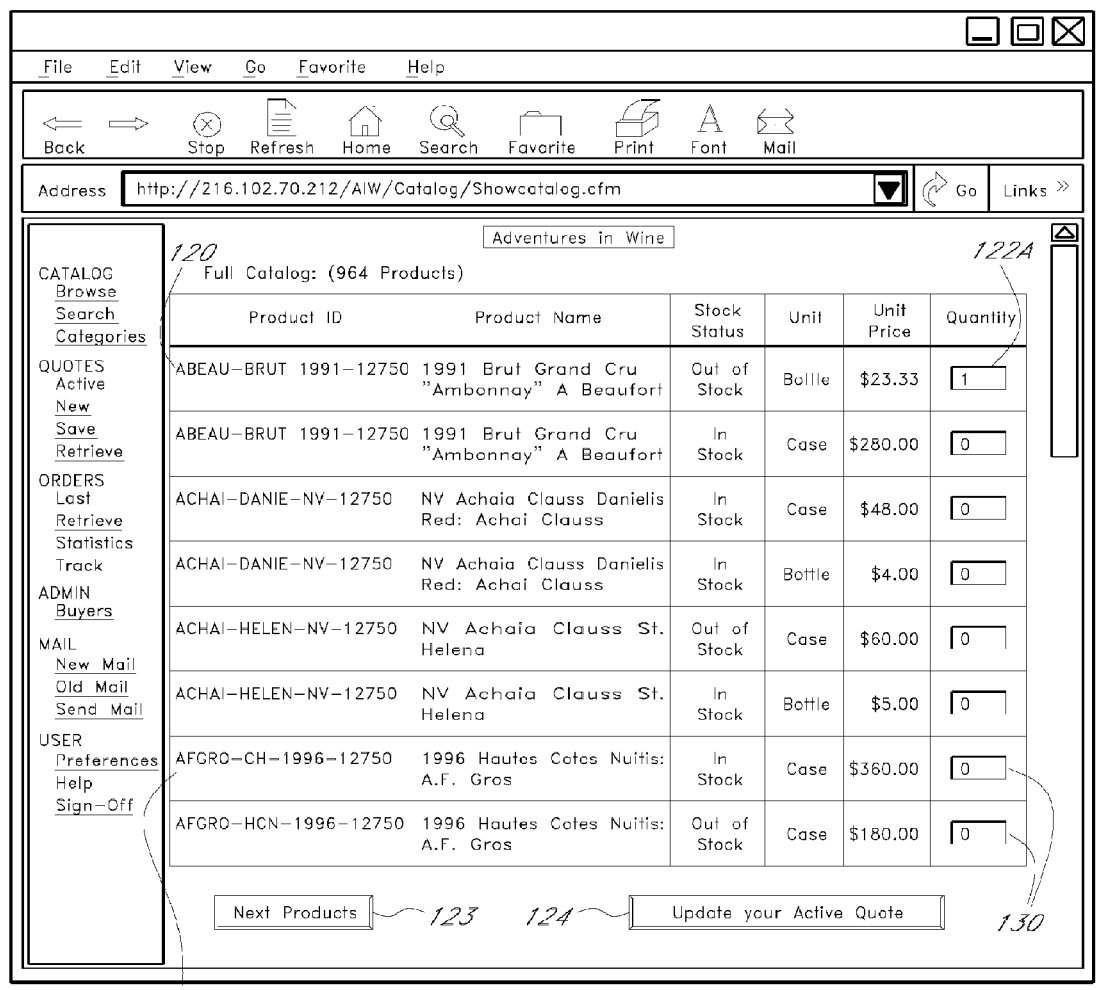
Figure 8:
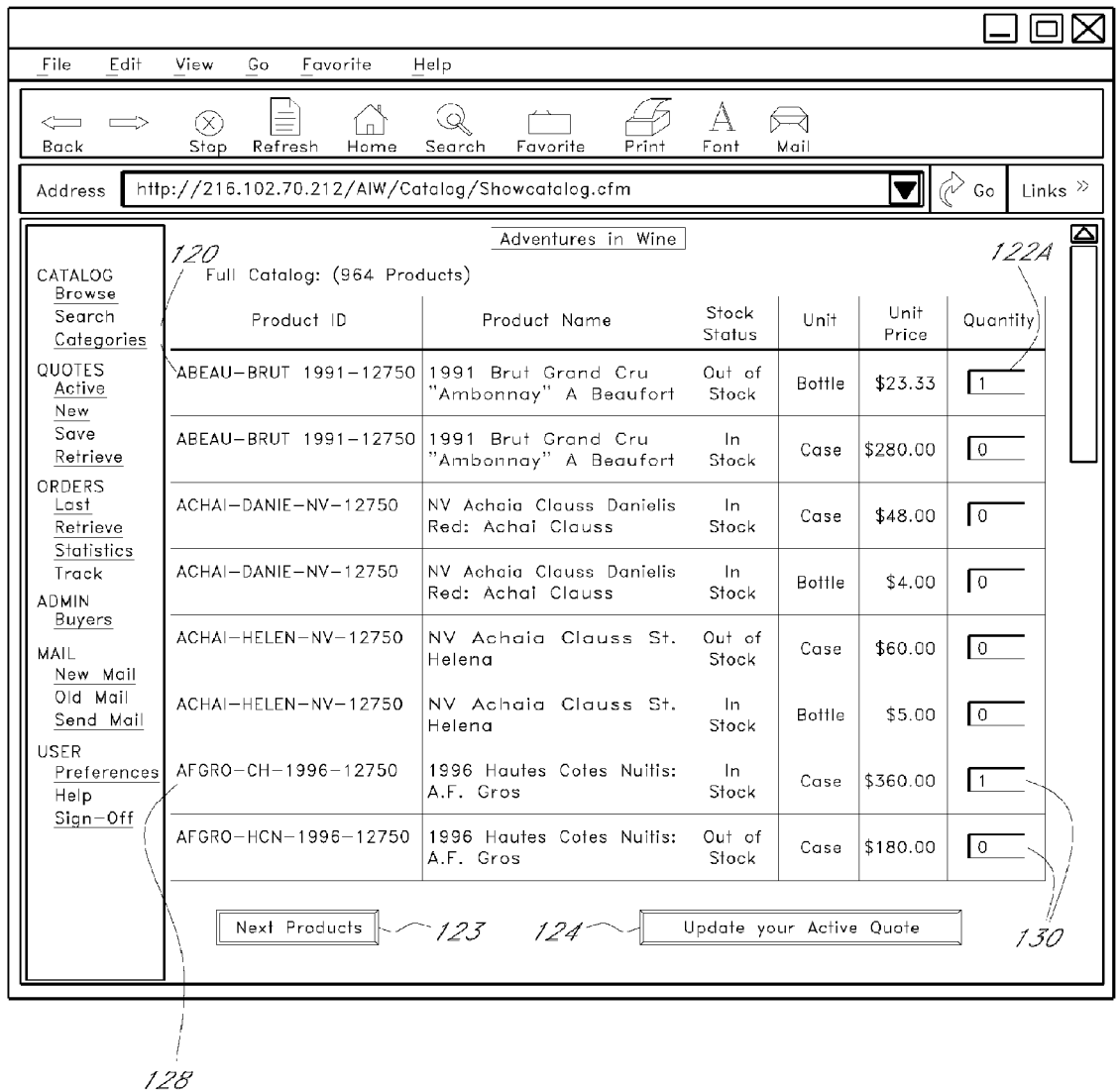
Figure 9:
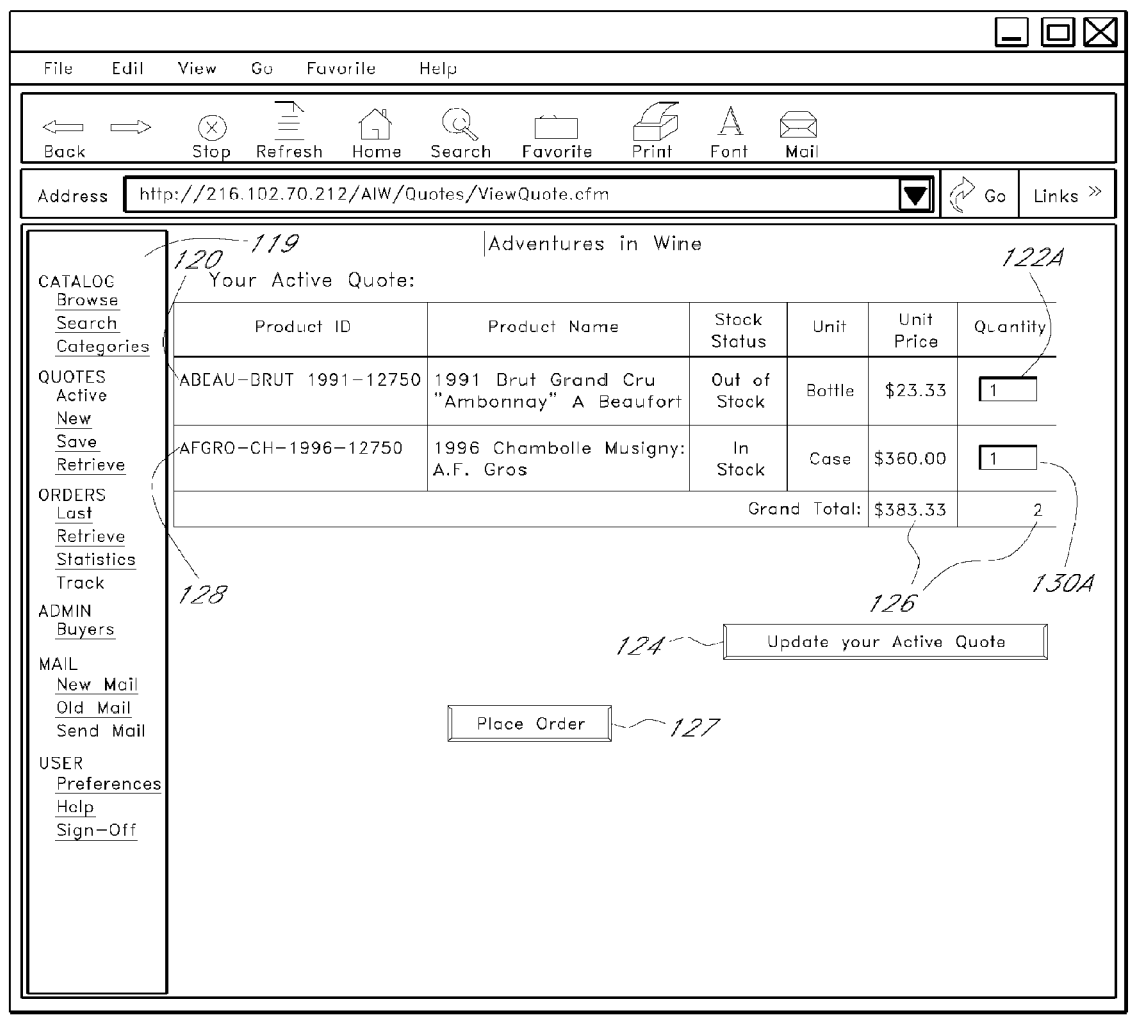

FIG. 7 illustrates a page produced by the customer application 51 in response to the selection of the "Browse" link in the navigation bar 119, after the Active Quote information has been updated. The quantity information 122A of product 120 has been updated by the customer application 51 to reflect the value in the Active Quote, as reflected in the quote database 92. Because the customer 72 has not yet selected an additional product 128 for prospective purchase, that item's quantity 130 still reads zero. Referring to FIG. 8, the quantity 130A of product 128 has been modified, indicating that the customer 72 has selected one item of this product 128 for prospective purchase. Pressing the "Update Active Quote" button 124 produces the screen display depicted by FIG. 9, which shows the updated quantities 122A, 130A of the respective products 120, 128 as they have been stored in the quote database 92, as part of the Active Quote. In addition, the grand totals 126 of both quantity and price have been updated with quantity information from the quote database 92, combined with price information from the product database 84. Once again, the customer 72 has the option of modifying the quantity fields 122A, 130A and updating the Active Quote with button 124, placing an order for the currently selected quantities using button 127, or continuing to browse or search the catalog with the navigation bar 119.

Figure 10:
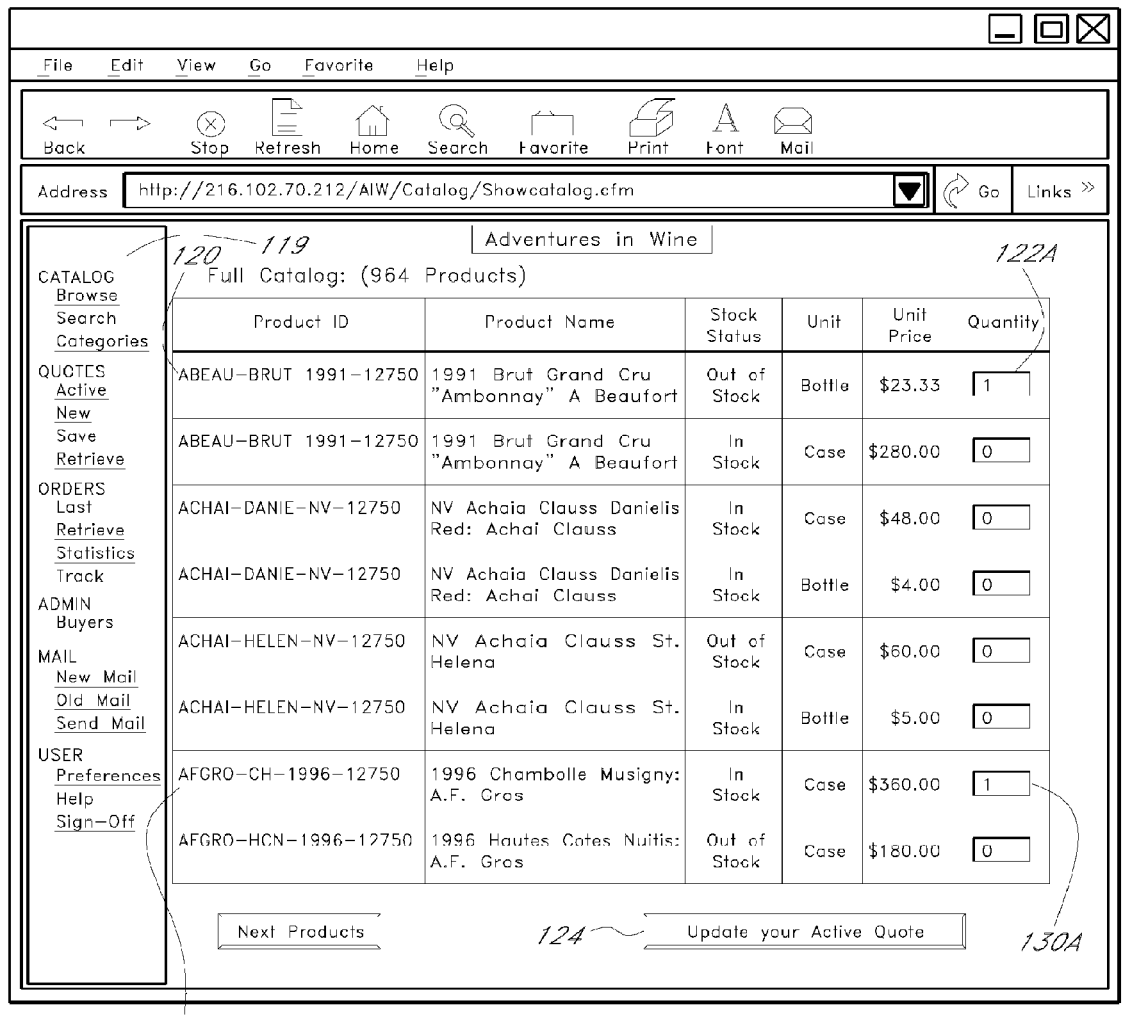
Figure 11:
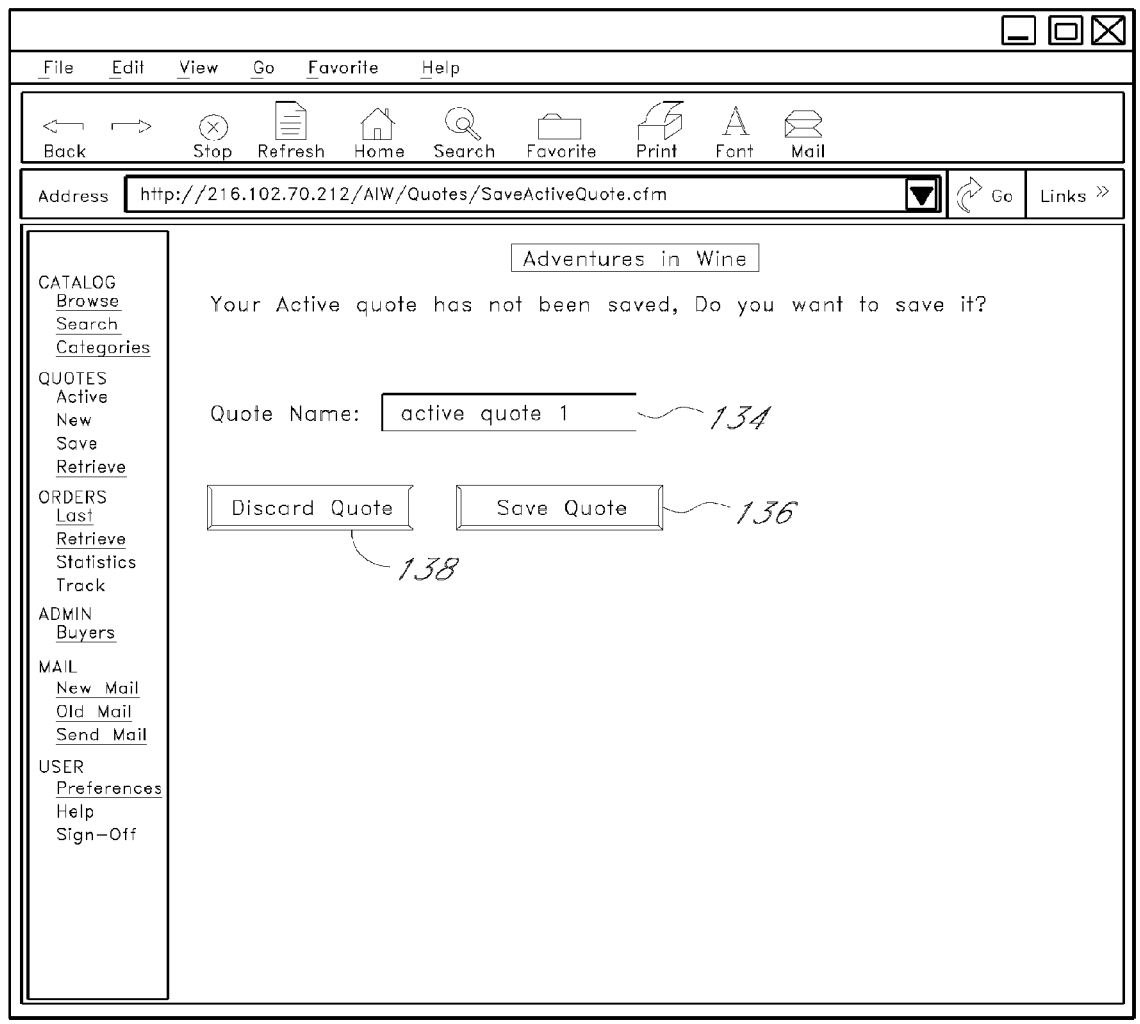

FIG. 10 is a screen capture of the customer application 51 once again producing a view of the items in the product database 84, using the "browse" mode. The customer application 51 has updated, using information from the quote database 92, the selected quantities 122A, 130A of the respective products 120, 128. In this case, the customer 72 can choose to save the Active Quote using the "Save" link 132 on the navigation bar 119. Selection of this link 132 produces the screen display shown in FIG. 11, which offers the customer 72 a field 134 in which to provide a name for the Active Quote to be saved, as well as a button 136, which when clicked, saves the Active Quote, and a button 138, which when clicked, discards the Active Quote. If the customer 72 chooses to save the Active Quote using the appropriate button 136, the customer application 51 will store the quantity information for the items selected for prospective purchase in the current transaction in the quote database 92 for future reference or retrieval. In one embodiment, the current Active Quote is saved automatically (using a default naming convention) when used to place an order.

Figure 12:
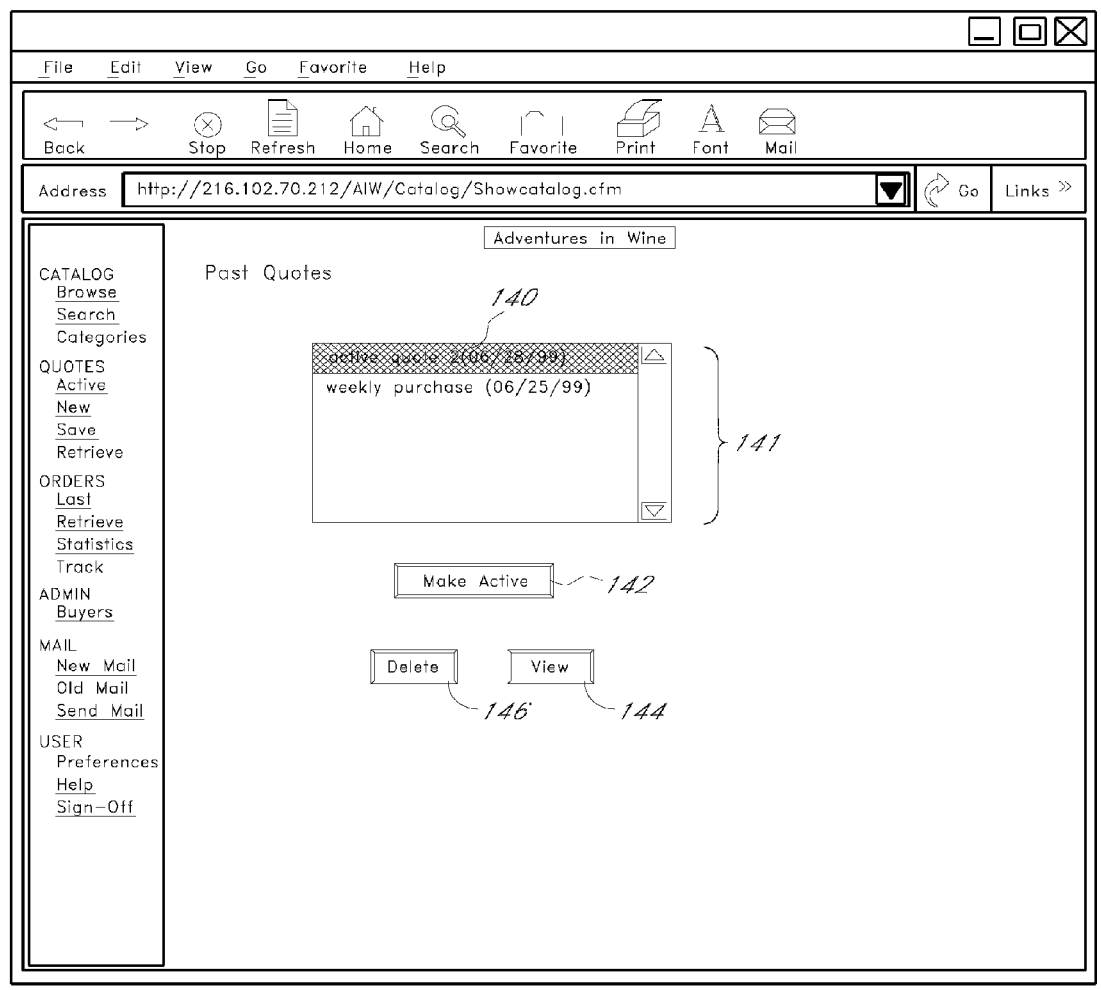

Referring again to FIG. 4, if the customer 72 chooses to retrieve a saved quote from the quote database 92 using the link 139 on the navigation bar 119, the customer application 51 will produce a screen display similar to that depicted in FIG. 12, allowing the customer to choose from among past quotes saved in the quote database 92. Each customer can only view the quotes saved by or for that customer, and not the quotes of other customers. On this screen, the customer 72 can highlight a past quote 140 and make it active using the appropriate button 142, causing the customer application 51 to retrieve all of the selected item quantity information from the quote database 92 for that quote and allowing the customer to see and modify the quantity information from the past quote for use in the present transaction. The retrieved quantity values for the saved Active Quote will be displayed to the user at any time the user views items in the catalog, whether browsing or searching the catalog 82, browsing categories 86 or accessing product information through some other method.

Figure 13:
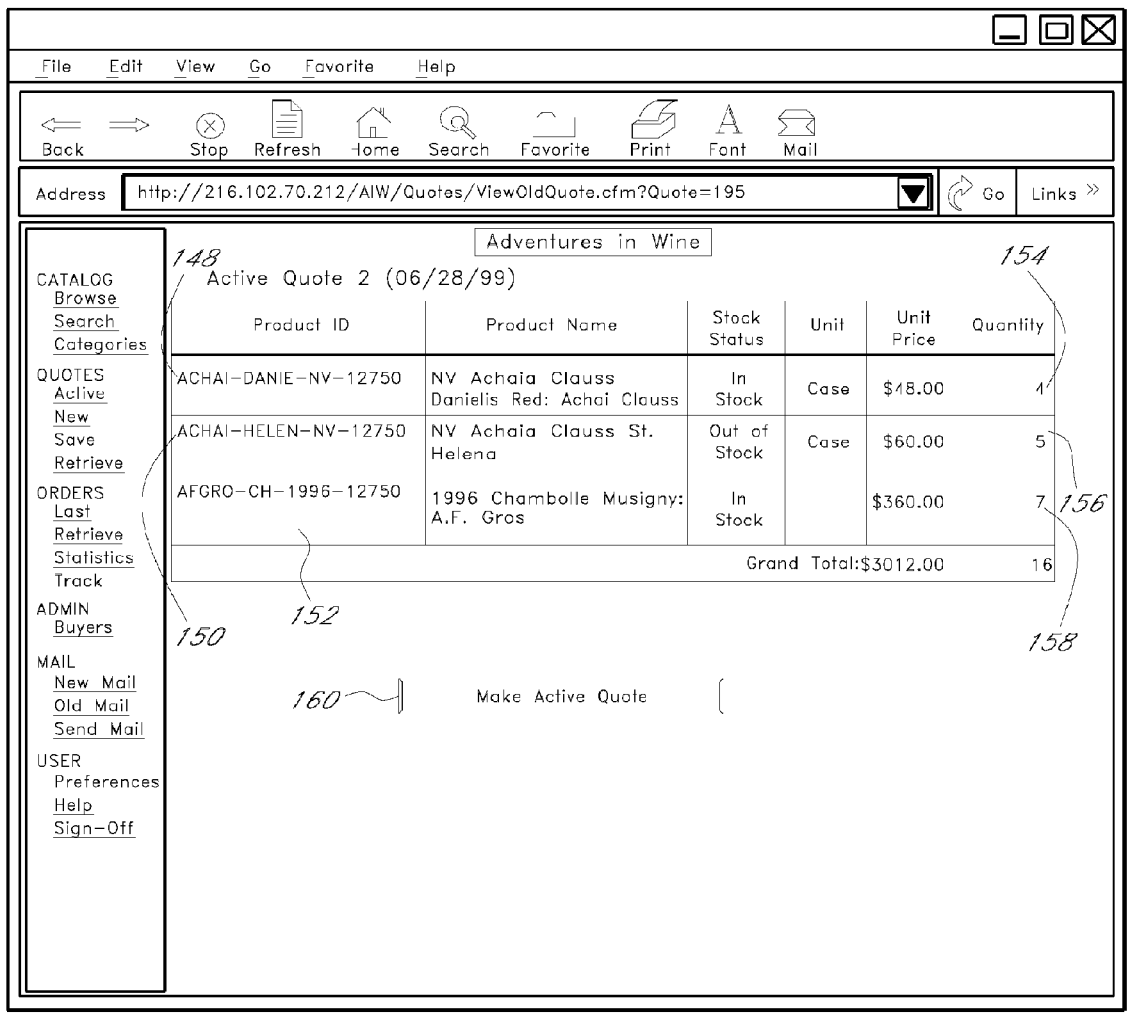

Alternatively, before making a past quote 140 active, the customer 72 can choose to view the items selected in the past quote with the "View" button 144, producing a screen similar to that depicted in FIG. 13. If after viewing the products 148, 150, 152 and their respective quantities 154, 156, 158, the customer 72 would like to make the past quote active, the user can press the "Make Active" button 160, retrieving product and quantity information from the saved quote 140 and combining it with the product catalog information as described above allowing the customer to see, use and modify the selected item quantities from the past transaction.

Thus, if a customer often places the same or similar orders, the dynamic selected-item tracking feature of the present invention offers a substantial savings in time for the customer by allowing the customer to quickly recall past transactions and use them as a template for the current order. In addition, this feature of the present invention allows the customer to more accurately place orders because the customer does not have to recall the items and quantities desired for each individual order, resulting in a substantial savings in both time and administrative costs for both the customer, as well as the merchant.

In another embodiment, the customer application 51 allows the customer 72 to combine multiple quotes or completed orders to create a composite order for use or modification in the current transaction. For example referring to FIG. 12, the customer 72 may be able to add a saved quote 140 to a quote that is currently active, or to select multiple quotes from list of past quotes 141 to make active simultaneously.

Figure 14:
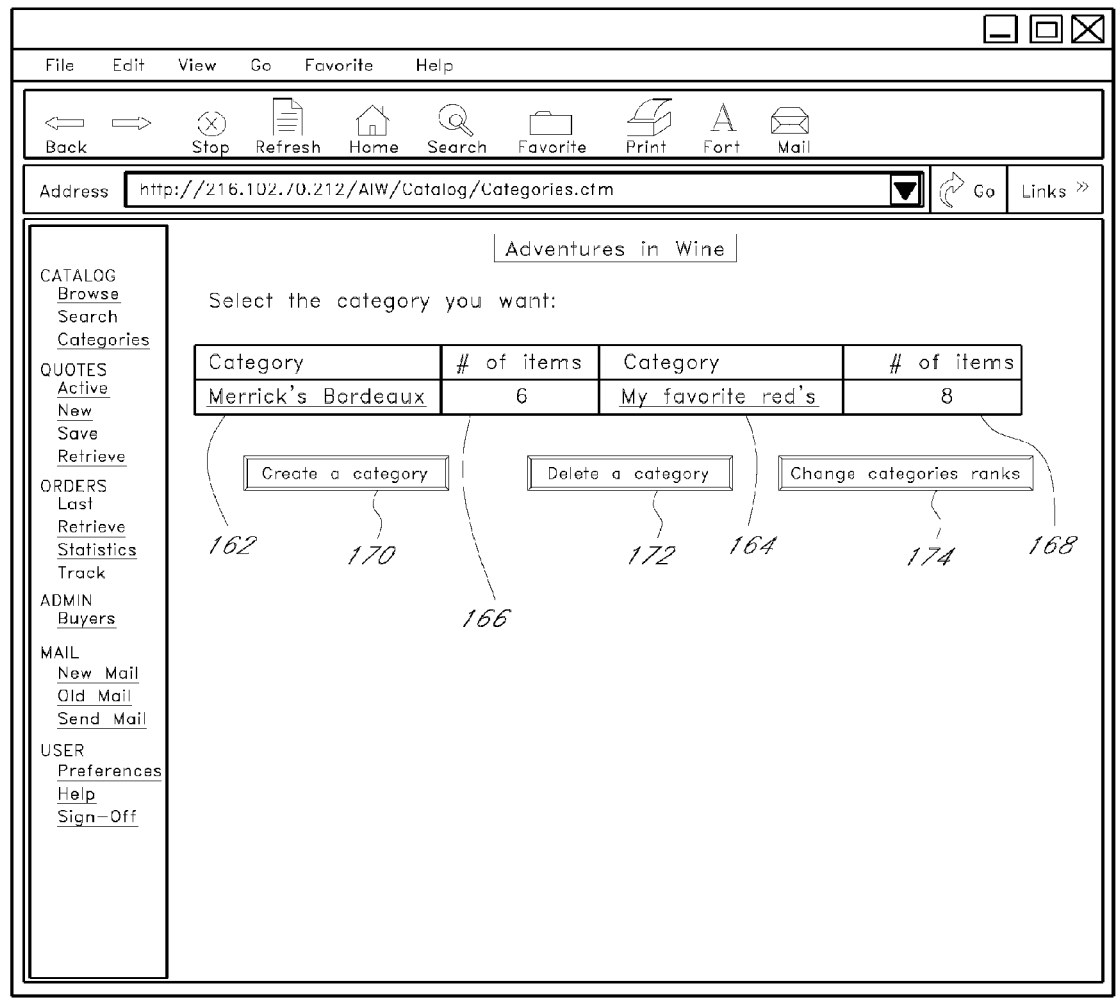
FIGS. 14-18 show "screen capture" depictions of an electronic commerce system utilizing customer configurable dynamic categories.

FIG. 14 is an example screen display depicting the dynamic, user-defined category feature of customer application 51. The screen depicts two categories, 162, 164, along with the number of items 166, 168 contained within each respective category. The categories may be either customer-defined, such as the category referenced by 164, or merchant defined, as is the category referenced by 162. In the preferred implementation, the customer application does not distinguish between the merchant-defined category 162 and the customer-defined category 164 when displaying categories, but an alternative implementation might visually distinguish the two types of categories. Both of the category names 162, 164 are hyperlinks. Clicking on either category will produce a screen displaying the items within that category. In addition, the customer 72 can choose to create a new category using the appropriate button 170, delete an existing category using the respective button 172 or reorder the categories using the corresponding button 174. Finally, the customer 72 can access the other features of the customer application 51 using the navigation bar 119.

Figure 15:
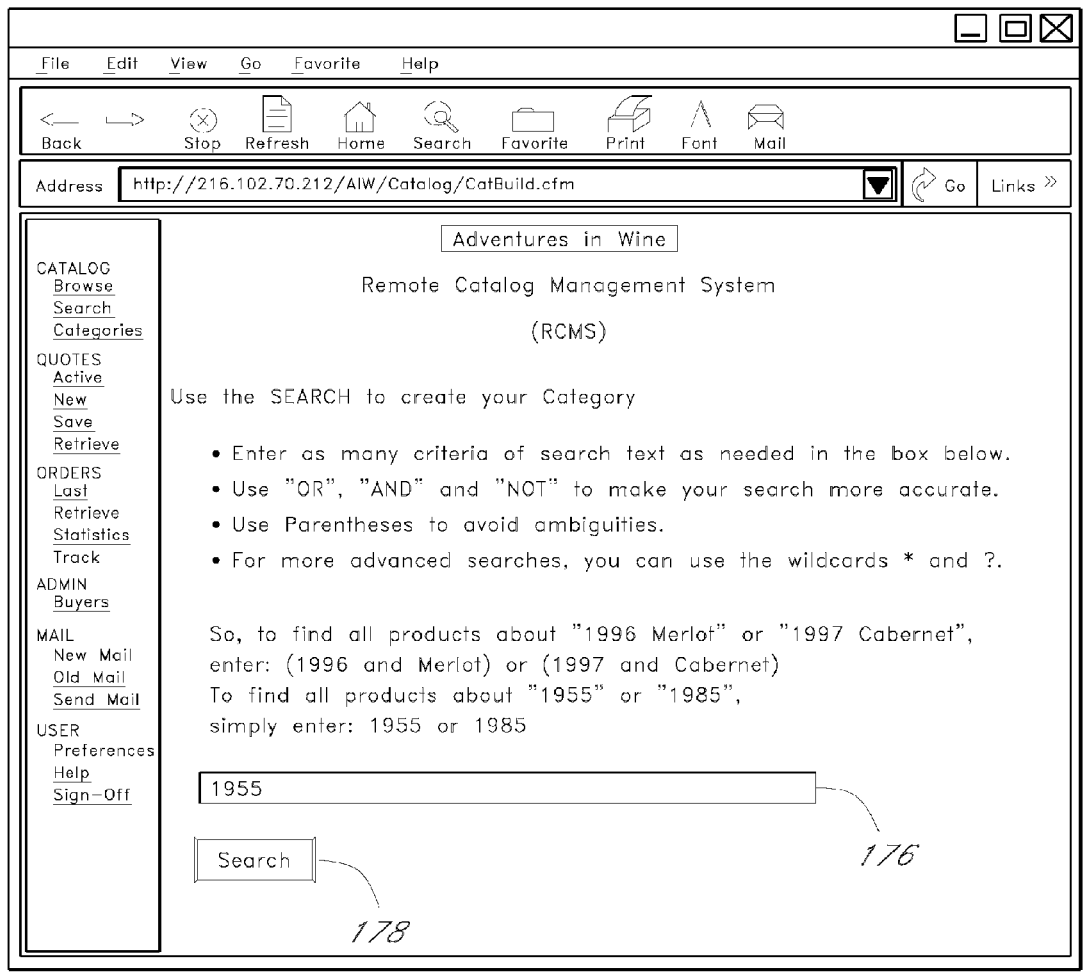

If the customer 72 selects the button 170 to create a category, the customer application 51 displays a screen similar to that depicted in FIG. 15. On this screen, the customer 72 is presented with a field 176 into which the customer can type search criteria, using standard Boolean logic or other search methods. After providing the search criteria, the customer 72 can press the "Search" button 178, at which point the customer application 51 will search the products database 84, using the search query provided by the user in the field 176. Typically, the search query is applied to the product names and descriptions provided by the merchant, although other known techniques of searching for products may also be used.

Figure 16:
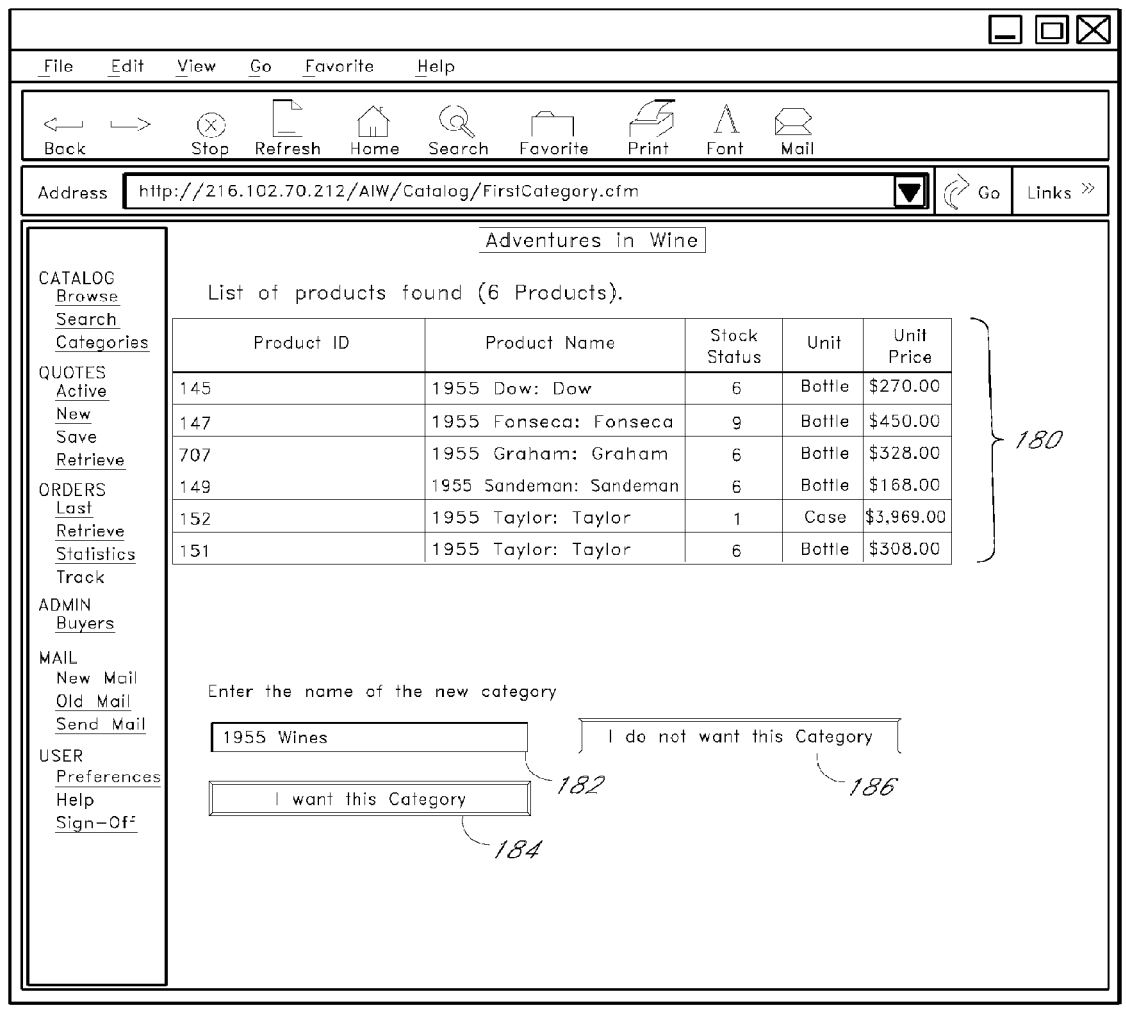

After performing the search, the customer application 51 displays the results of the search on a screen similar to that depicted in FIG. 16. On the results screen, the customer application 51 displays a list of products 180 matching the search query entered in the field 176. The customer application 51 also displays a field 182 into which the customer 72 can type a name with which to save the new category in the category database 88. The customer 72 can enter a name into the field 182 and press the appropriate button 184 to save the new category, or alternatively the customer can choose to discard the results of the search without creating a new category by pushing another button 186.

Figure 17:
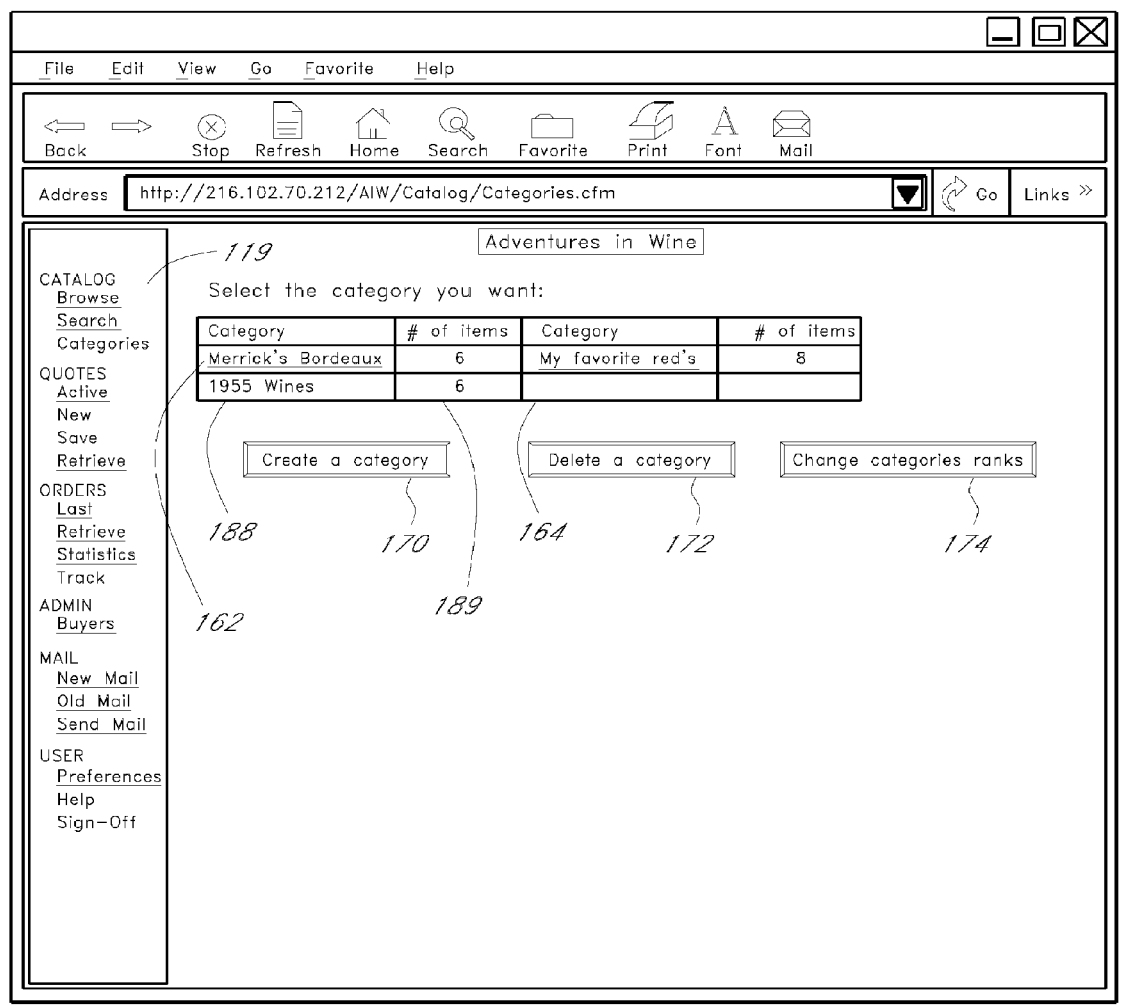
Figure 18:
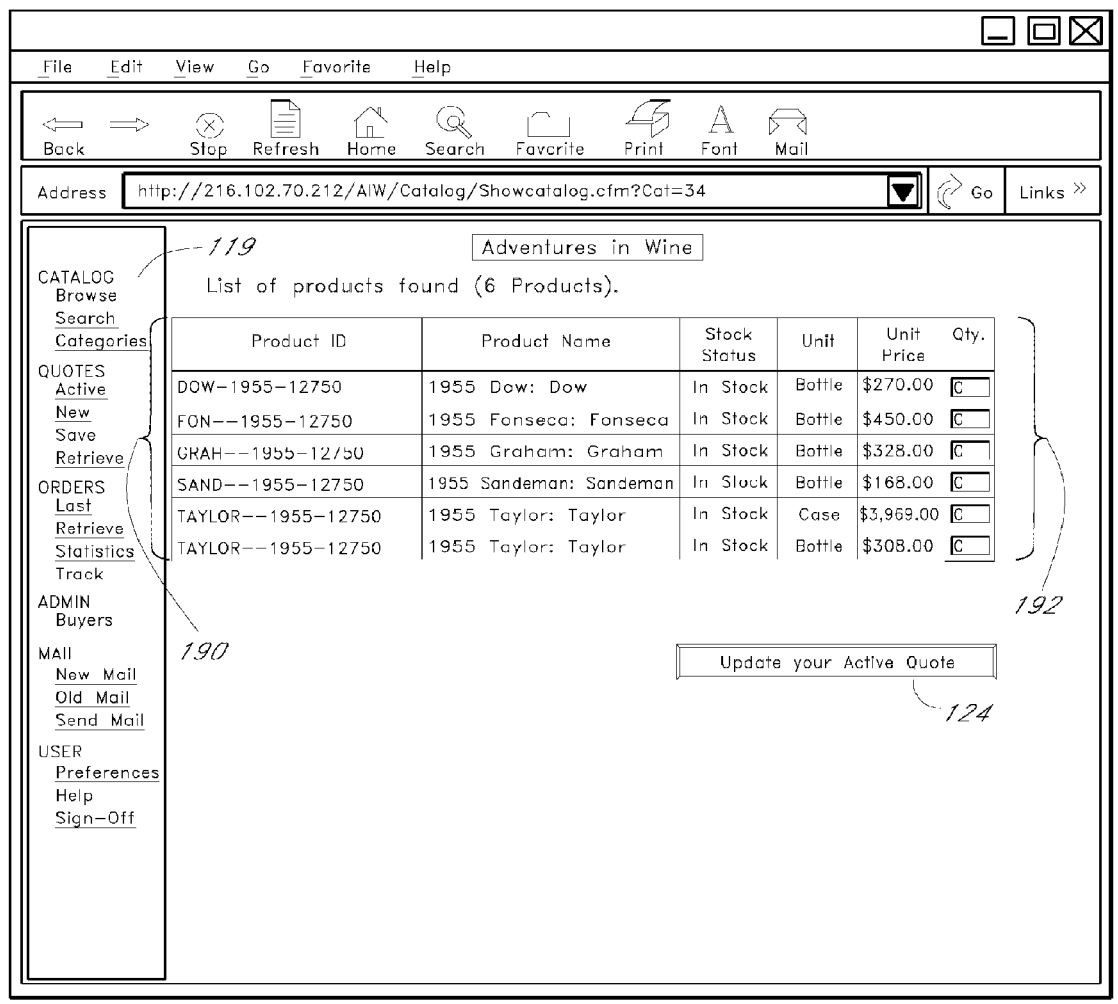

If the customer 72 does save the category using the appropriate button 184, the customer application 51 returns to the category list screen as depicted in FIG. 17. In addition to the pre-existent categories 162, 164, the new saved category 188 is displayed as a hyperlink for selection by the customer 72 and is saved in the category database 88 for future use. If the customer 72 clicks on one of the hyperlinks for a category 188, the customer application 51 displays a list of products matching the query associated with that category, as shown in FIG. 18. In the preferred implementation, the customer application 51 searches the product database 84 for products matching the search criteria for each category before displaying the category list screen, depicted by FIG. 17, in order to provide an updated count of the number of items 189 in each category 189. In addition, under the preferred implementation, the customer application 51 caches the results of these searches. When the customer 72 subsequently selects one of the hyperlinks for a category 188, the customer application 51 recalls the cached product list for that category and displays it to the user, as shown in FIG. 18.

In an alternative implementation, the number of items in each category might be stored within the category database 88, instead of dynamically calculated by the customer application 51. Additionally, in an alternative implementation, when the customer selects a category hyperlink 188, the customer application 51 might not use the cached results of searches performed when displaying the category list screen (FIG. 17) to display the items in the category. Instead, in this alternative implementation, when the customer selects a category hyperlink, the customer application might search the product database 84 at that time, using the query associated with that category, stored in the category database 88, and display the products matching the search criteria, as shown in FIG. 18.

Under either the preferred or the alternative implementations described above, the customer application 51 dynamically provides an updated list of products in the category every time the customer 72 views that category. Thus, when items are added to the product database 84, the customer application 51 will automatically include any new items matching the search criteria for a particular category the next time category is viewed by the customer 72, without requiring any other action on the part of the merchant 74 or the customer 72.

Referring to FIG. 18, in addition to showing the products within the category (collectively referred to as 190), the customer application 51 also shows the quantity information 192 for those products obtained from the quote database 92 by the dynamic selected-item tracking system, as explained above. On this screen, the customer 72 can modify the quantity 192 of any product 190 within the category to select the product for prospective purchase in the current transaction. When the customer 72 selects the appropriate button 124, the customer application 51 updates the quote database 92 with the currently-selected product 190 and quantity 192 information. Alternatively, the customer 72 can choose to access other features of the customer application through the navigation bar 119.

One important advantage of this embodiment of the present invention over the prior art is the fact that the categories are dynamic, in that the category database 88 contains the queries that define the categories and not the products within the categories themselves. In this way, whenever a category is selected, the customer application 51 constructs the category dynamically by performing a search of the product database 84, using the search criteria associated with the selected category. Another implementation might use a different method to allow customers to categorize products, for instance a checkbox next to each product, which, when checked, would add the selected product to a particular category. Another important benefit of the present embodiment is that the customer 72 can easily and quickly create private categories for future use by the customer alone. In addition, as will be seen, the merchant 74, through use of the merchant application 53, can also create and modify public categories for use by all customers of that merchant.

Figure 19:
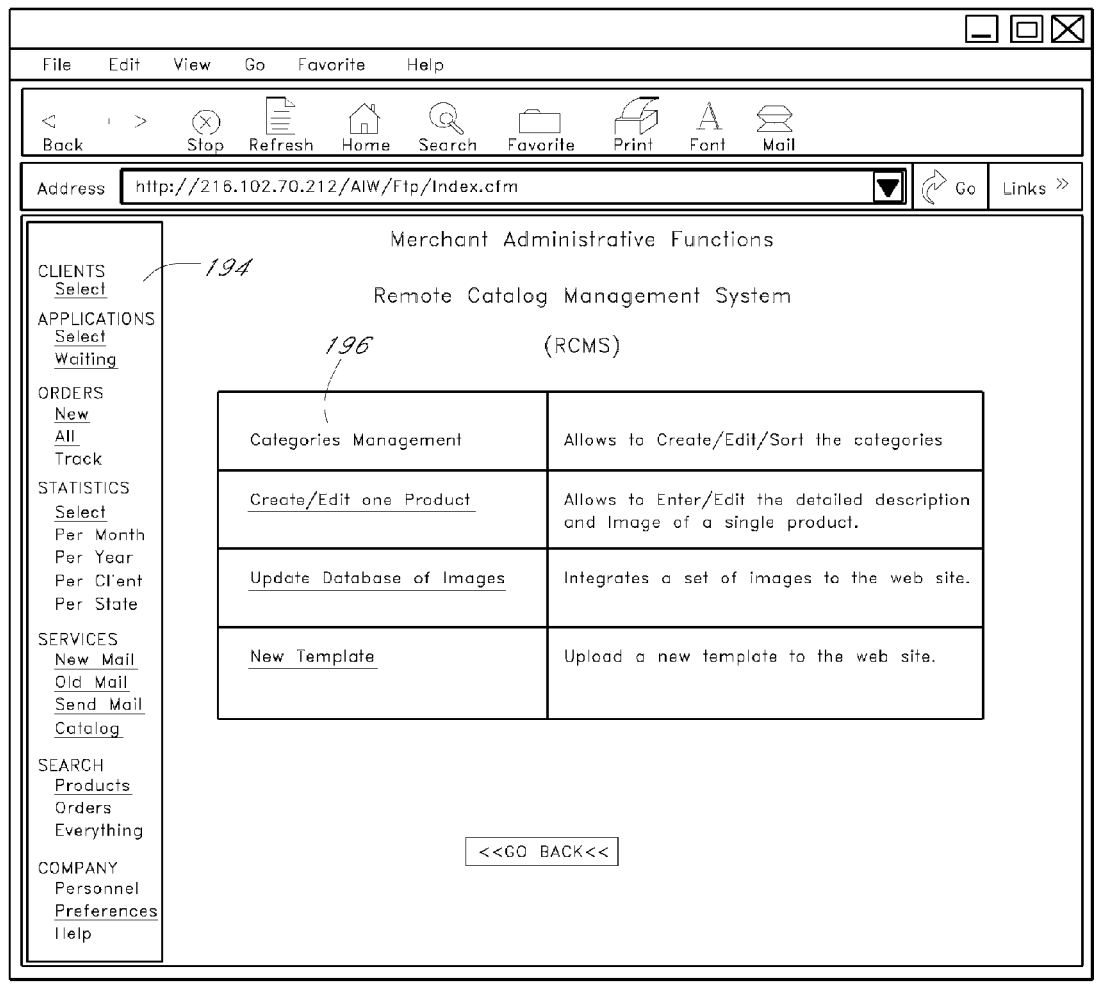
FIGS. 19-24 show "screen capture" depictions of an electronic commerce system utilizing merchant configurable dynamic categories.
Figure 20:
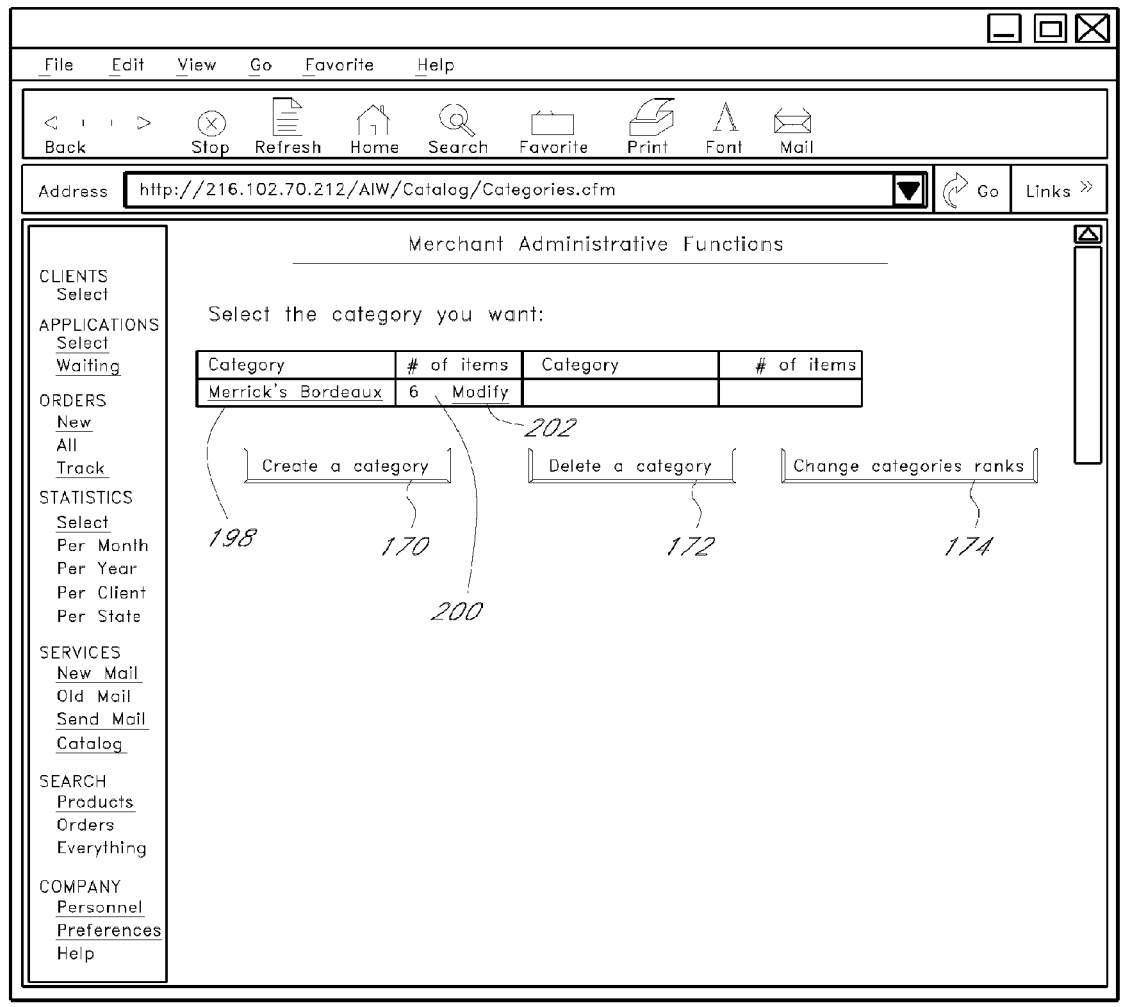

FIG. 19 is a screen display depicting the merchant application 53. Similar to the customer application 51, the merchant application 53 contains a navigation bar 194 for navigating among the various functions provided by the merchant application. In particular, the merchant application 53 allows the merchant 74 to create and maintain categories in a similar fashion to the facility provided to customers, described above. If a merchant selects the category management hyperlink 196, the merchant application 53 produces a screen, similar to that depicted in FIG. 20, which displays each public category 198, along with the number of items in that category 200. In addition to the buttons for creating a category 170, deleting a category 172, or reordering categories 174, that the merchant application 53 shares with the customer application 51, the merchant application also allows the merchant 74 to modify the category using the link 202 next to the category name 200. By modifying a category, the merchant 74 can change the search parameters that define that category without having to delete that category and create a new category. Although the preferred implementation only describes this feature in the context of the merchant application 53, the customer application 51 of the present invention also includes this feature, providing the customer 72 with the ability to modify private categories, as well.

Figure 21:
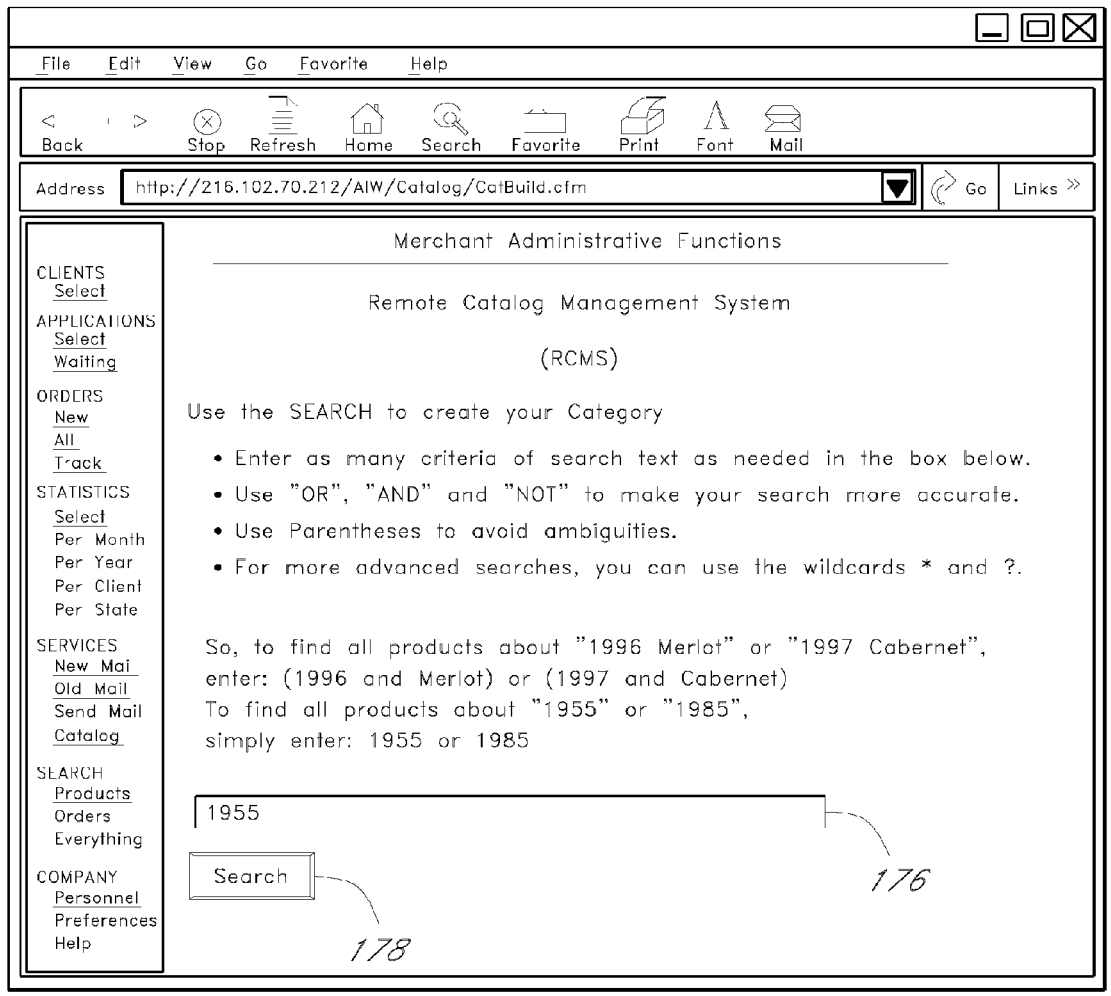
Figure 22:
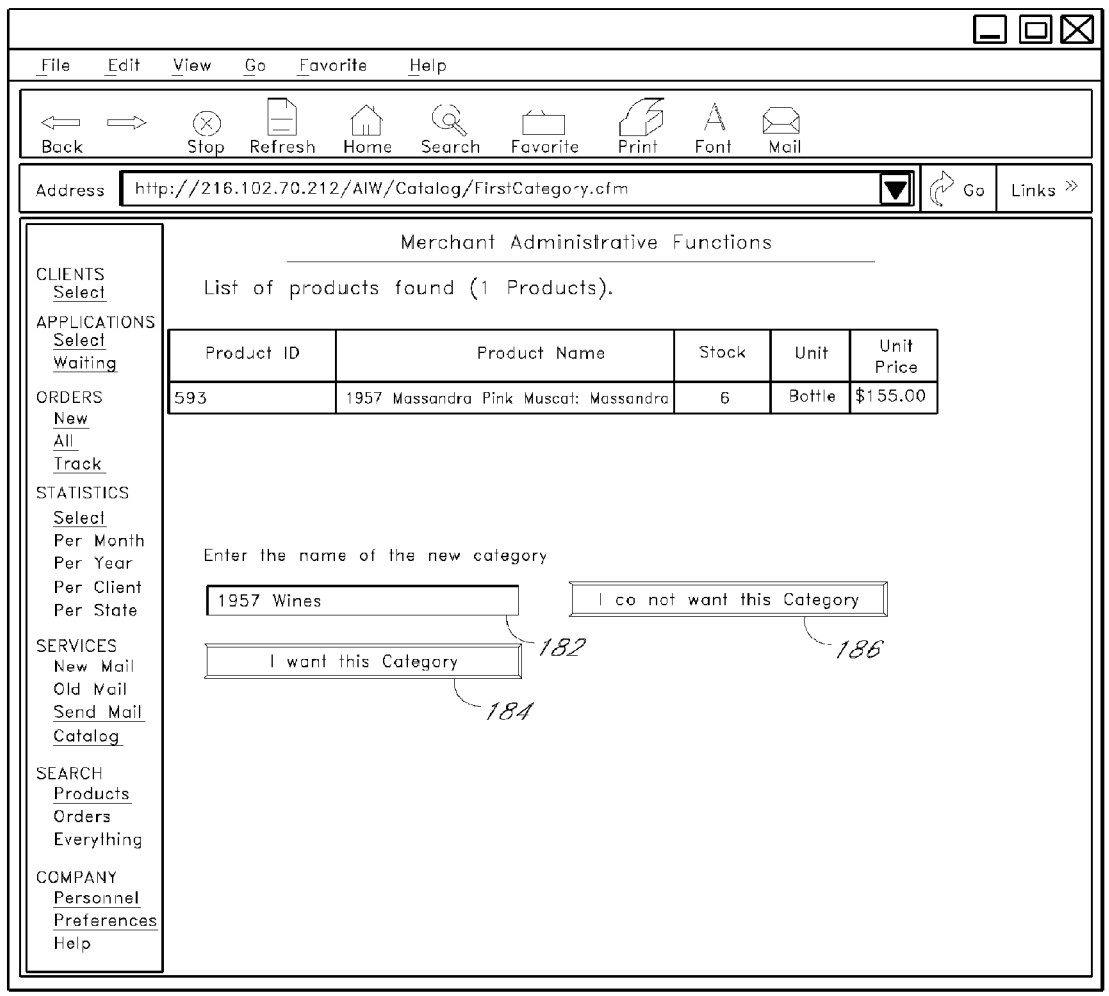
Figure 23:
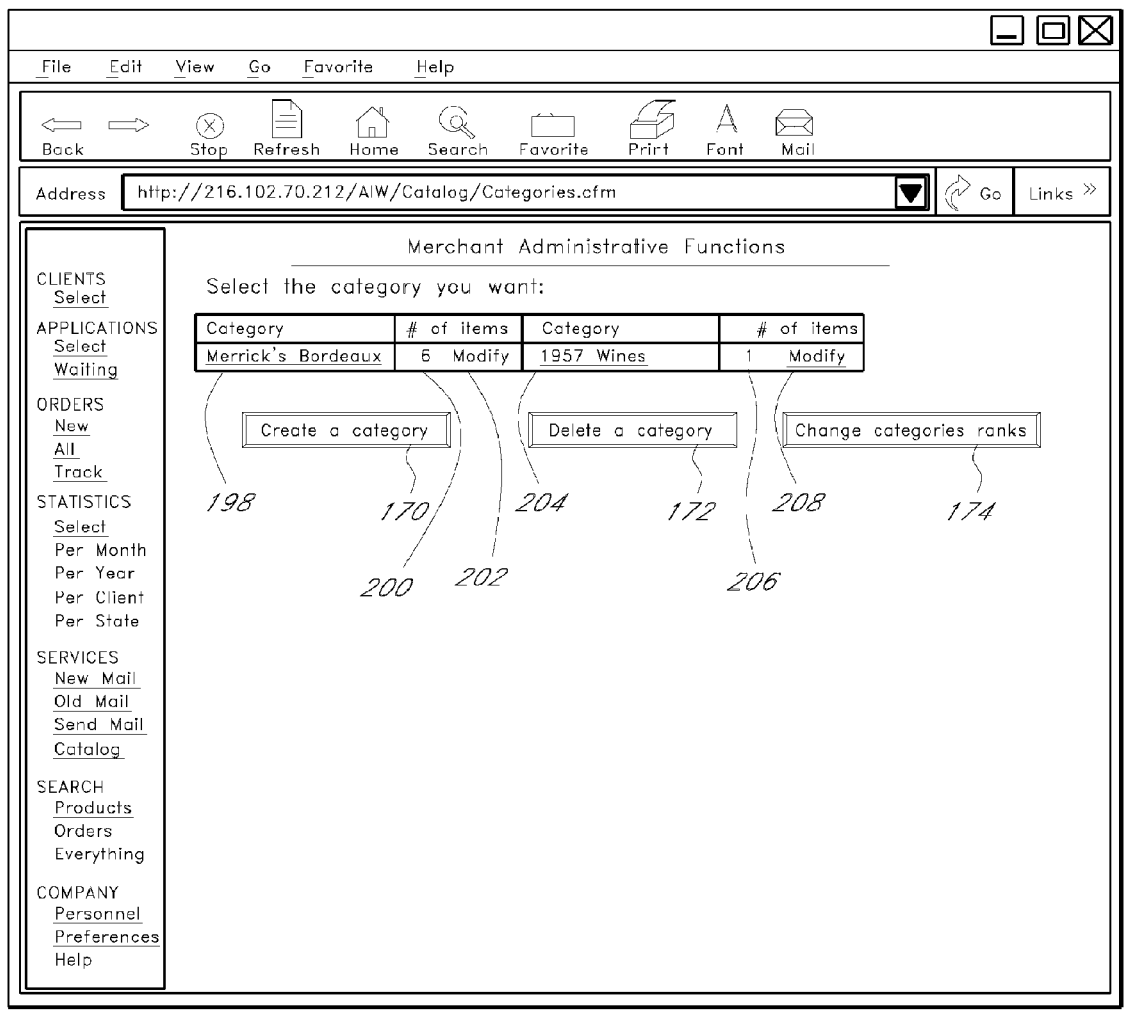
Figure 24:
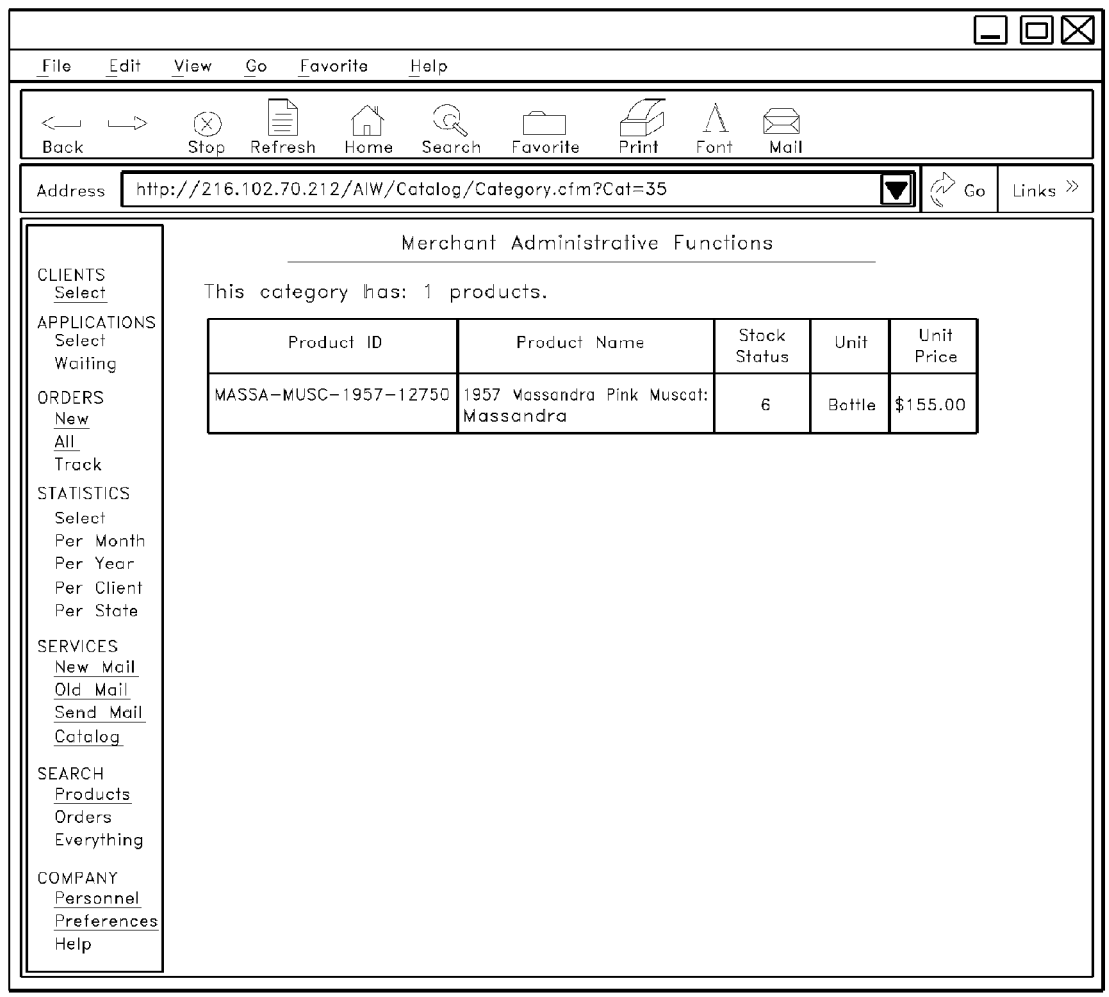

The method provided to the merchant 74 for creating categories is similar to that provided to the customer 72 for creating private categories and is shown in FIG. 21. The merchant can provide search criteria using standard Boolean logic or other search formats in the "Search Criteria" field 176 and press the "Search" button 178, at which point the merchant application 53 executes the search, using the criteria entered by the merchant 74, and displays a list of products matching the search criteria, as illustrated in FIG. 22. Similar to the customer application 51, the merchant application 53 provides a field 182 for naming the category, as well as a button 184 to save the category and a button 186 to discard the category, in the event that saving the category is not desired. If the merchant 74 chooses to save the category using the appropriate button 184, the merchant application 53 will add the search criteria for the category to the category database 88 and will display the new category in the list of categories as depicted in FIG. 23. In addition to the pre-existent category 198, with its associated number of items 200, the category lists now shows the newly created category 204 with its associated number of items 206. In addition, the merchant application 74 provides a hyperlink 208 to modify the search criteria for the new category 204, in the same way it provides a hyperlink 202 to modify the pre-existent category 198. When the merchant 74 clicks on a hyperlink 204 for a category, the merchant application 53 applies the associated query to the product database 84 and displays the search results, as depicted in FIG. 24. In other embodiments, the ability to store queries as categories for later use according to the invention can also be used to assist users in locating other types of items, such as online auctions, classified advertisements, chat rooms, and other web sites.

An additional feature of the present invention is the ability of both the customer 72 and the merchant 74 to communicate with one another via electronic messages, including messages that are linked to specific orders. This feature further provides both the customer 72 and the merchant 74 with the ability to view an entire history of the messages with respect to any particular order. The customer application 51 provides the facility for the customer 72 to submit orders and view the status of submitted orders. The merchant application 53 provides the facility for the merchant 74 to view, process, and update the status of orders. Both the customer application 51 and the merchant application provide the customer 72 and the merchant 74, respectively, with the option of sending a message, which is linked to a particular order, to the other party at any time in the order placement and fulfillment process. In addition, both the customer application 72 and the merchant application 74 include a facility, in the form of a "history" button, to view a complete or partial message history for a particular order. In other embodiments, the option to view the message history may be provided to only one of the two parties.

For example, FIG. 25A shows a screen display produced by the merchant application 53, allowing the merchant 74 to view the customer's order. On this screen, the merchant 74 can update the status of the order (for instance, from "accepted" to "shipped"), by changing the value in the pulldown menu 211 and then selecting the "Update, then view next" button 213. In addition, the merchant 74 can view that latest message 215 from the customer 72, send a message to the customer, using the message input area 217. Finally, the merchant 74 can view a history or log of all messages relating to the current order, by pressing the "History" button 219.

Figure 25:
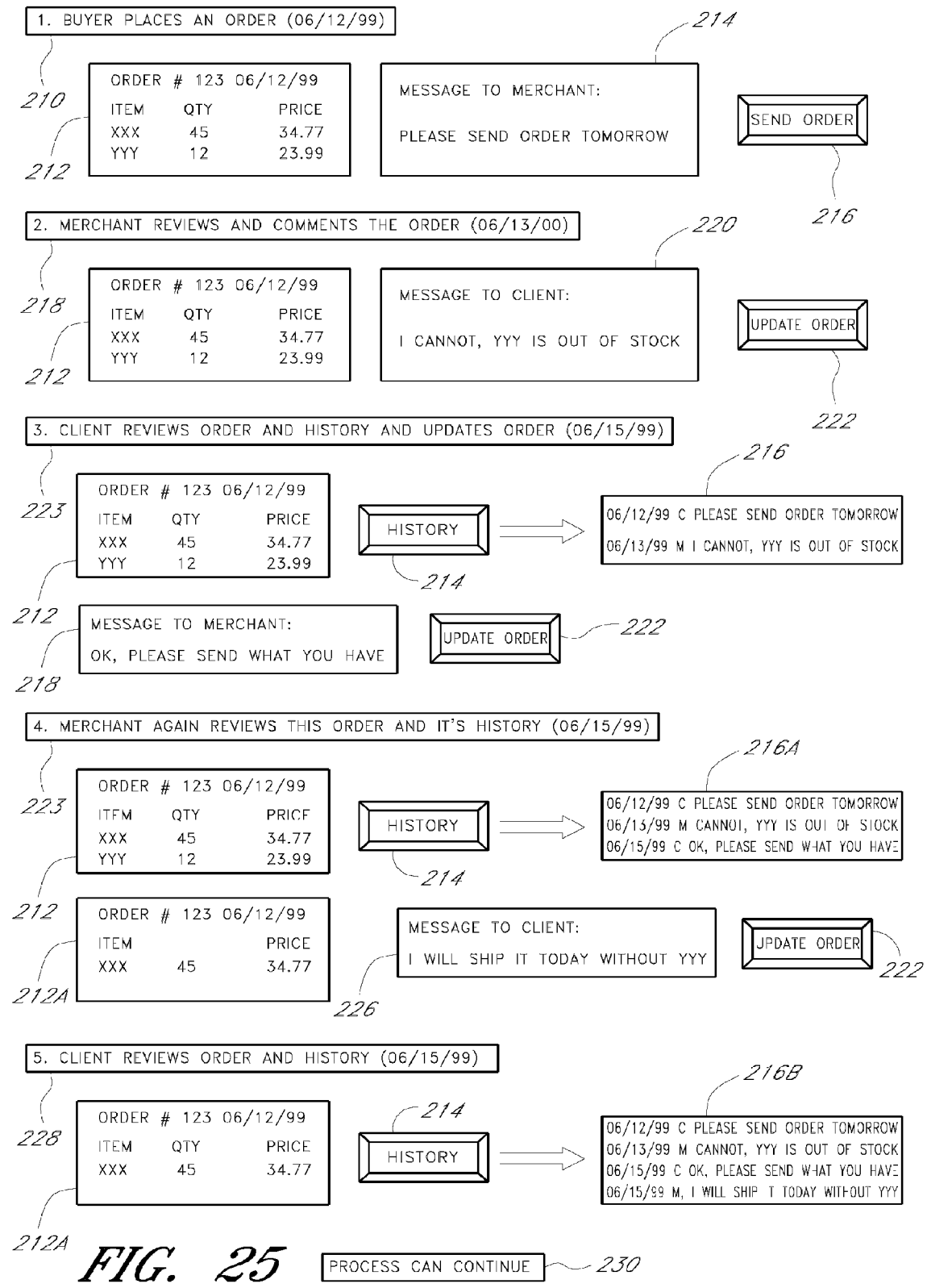
FIG. 25 shows a conceptual diagram of a transaction between a merchant and a customer, utilizing a message audit trail feature.

FIG. 25 shows a theoretical transaction between a customer or buyer 72 and a merchant 74, utilizing the message audit trail feature of the present invention. In step 1 of the transaction, represented by box 210, the customer 72 places an order with the merchant 74. Along with the order 212, the customer 72 has included a message 214 to the merchant 74, which the user has entered into a message box at the bottom of the order form (not shown). The message reads, "Please send order tomorrow." When the customer presses the "Send Order" button 216 on the order form (not shown), the order and corresponding message 212 are transmitted to the merchant 74.

In step 2 of the transaction, represented by box 218, the merchant 74 receives and reviews the order 212 and sends a message 220 in response to the customer's message 214, to the effect that the order cannot be filled as requested because one of the items ordered is out of stock. The facility allowing the merchant 74 to send such a message to the customer 72 is provided by the merchant application 51. When the merchant 74 presses the "Update Order" button 222 on the order form (not shown), the merchant's message 220 is linked to the order 212.

In the next step 223 of the transaction, the customer 138 reviews the order 212, and pushes the history button 214 on the order form (not shown), at which time all of the messages 216 linked to the order 212 are displayed to the customer 72. The customer 72 then types a response 218 to the merchant 74 and presses the "update order" button 222, indicating that the merchant should simply fill the available portion of the order and send it immediately.

Next, in step 224, the merchant 74 reviews the order 212 and upon pressing the history button 214 on the pending order page (not shown), is presented with the updated history 216A of all messages linked to the order 212. The merchant then modifies the order 212A to accommodate the customer's request in the latest message 218 and sends another message 226 to the customer 72, indicating that the available portion of the order will be shipped immediately. The merchant 74 then presses the "update order" button 222 on the order form (not shown), updating the order information.

Finally, in step 228, the customer 72 reviews the modified order 212A and upon pressing the history button 214 on the order form (not shown), is presented with the entire history 216B of all messages linked to the order 212A, completing the transaction. As noted in box 230, this process can continue indefinitely and provides a tangible record of the complete transaction between merchant 74 and the customer 72.

The message audit trail of the present invention preferably provides the message audit trail in summary form if the message history linked to a particular order exceeded a threshold value, either in terms of characters (or bytes), or in terms of number of messages contained in the log. This summary format displays the first few words of each message in the history, along with a hyperlink to the full text of the corresponding message, in order to allow the customer 72 or merchant 74 to quickly find and access a particular message from among an extensive history of such messages. An additional implementation could also include a facility for searching the full text of the message log in order to more easily facilitate locating a particular message in the transaction. In yet another implementation, the electronic commerce system of the present invention could allow the merchant 74 and the customer 72 to send electronic mail to one another over the Internet or some other electronic mail system, and could maintain a message audit trail for those messages as well. In such an implementation, the message audit trail could also be linked to the order to which the messages pertain. It will also be recognized that the message audit trail feature can be used in transactions.

Figure 26:
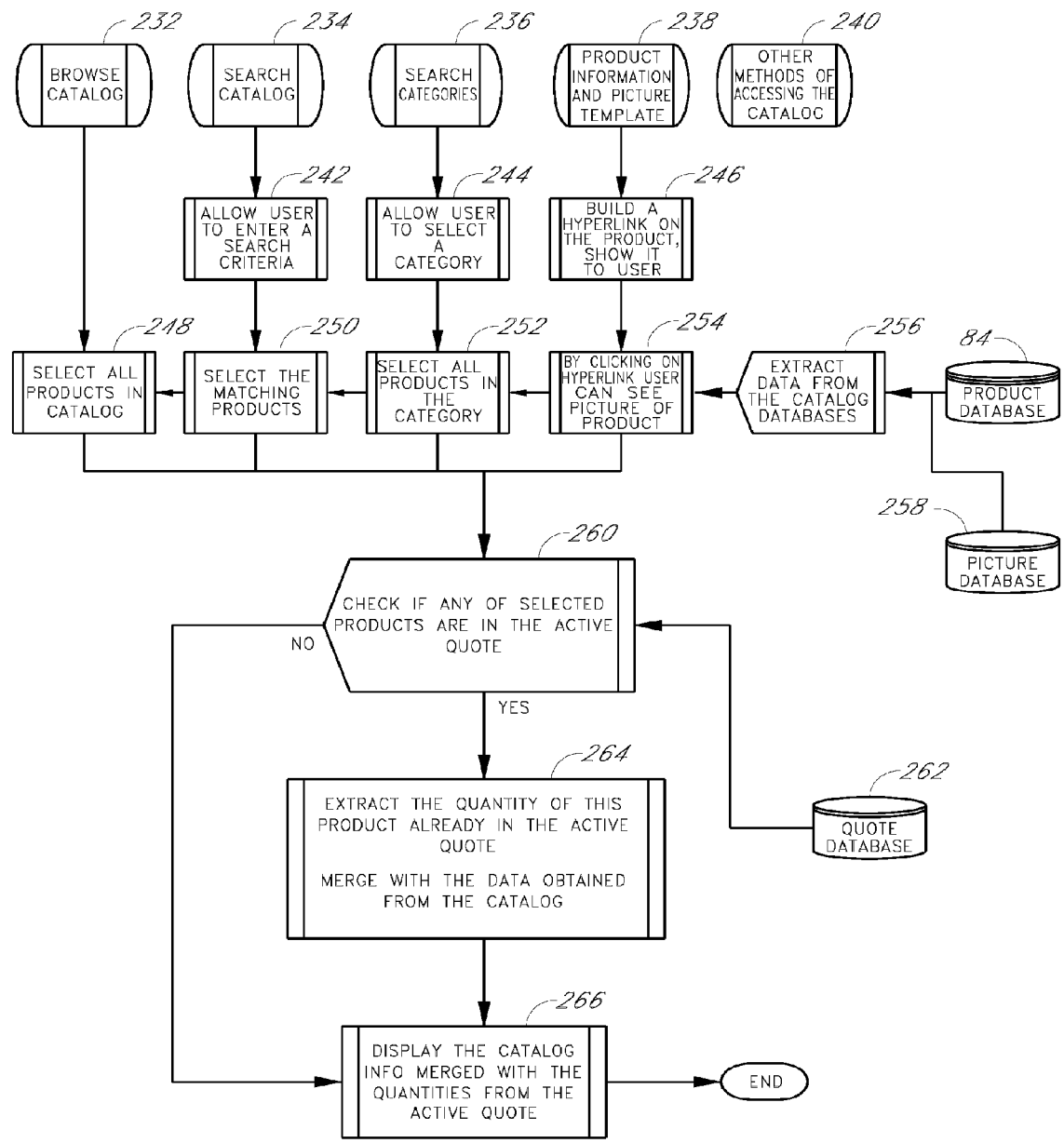
FIG. 26 shows a process flow diagram of a dynamic selected-item tracking feature.

FIG. 26 shows a process flow diagram for the dynamic selected-item tracking ("Active Quote") feature of the present invention. The diagram illustrates a sequence of steps that are performed by the customer application 51 to maintain a dynamic record of the respective quantity of each item selected for prospective purchase in the current transaction. Products can be selected for prospective purchase through a variety of methods 232, 234, 236, 238, 240. If the customer 72 chooses to simply browse the catalog 232, the customer application 51 will select for dynamic tracking all products in the catalog 248. If, alternatively, the customer 72 chooses to search the catalog 234, after the user enters a search criteria 242, the customer application 51 selects for dynamic tracking the products that match the search criteria 250. If the customer 72 instead chooses to search the catalog using categories 236, the customer application 51 allows the customer 72 to choose a category 244 and subsequently selects for dynamic tracking all products in the chosen category 252. Finally, if the customer 72 chooses to use a product information and picture template 238, to find products, the customer application 51 builds a hyperlink 246 and displays it for the customer 72. If the customer 72 selects the hyperlink, the customer application 51 selects the linked-to product for dynamic tracking 254. Thus, although the customer 72 can access product descriptions and selections through a variety of methods 232, 234, 236, 238, 240, the customer application 51 dynamically tracks the selected items, no matter how the customer selects the products. In another embodiment, the customer application 51 could also be used to dynamically track items selected by other methods, for example by linking from another web page, either within or without the merchant's web site.

After the products have been selected for dynamic tracking 248, 250, 252, 254, the customer application performs the step 256 of extracting the respective product data from the product database 84 and the picture database 258, as necessary. The customer application 51 next performs the step 260 of searching for the selected products in the quote database 262. If the customer application 51 fails to find any of the selected products in the quote database 262, it performs the step 266 of merely displaying the catalog information for the selected items. If, on the other hand, the customer application 51 does find some of the selected items in the quote database 262, it performs the steps 264 of retrieving from the quote database the quantity of each product found there and combining this quantity, with the respective data obtained from the product and picture databases to integrate information about the currently-ordered quantity with the description of the product and other product information. It then performs the step 266 of displaying the combined information to the customer 72 using whichever selection interface 232, 234, 236, 238, 240 the customer used to select the items. In this way, the customer application 51 tracks the items currently selected by the user for viewing and dynamically updates and displays the quantity of each item selected for prospective purchase in the current transaction, without requiring the user to visit a separate screen or page.

Those skilled in the art are familiar with the technique of using categories to subdivide a product catalog, in order to facilitate browsing by a customer. Creating and maintaining these categories can be a difficult task and is normally performed solely by the merchant for the benefit of the customer. Thus, one object of the present invention is to simplify process of the creating and maintaining categories for merchants. Another, related, object of the present invention is to enable users themselves to create and maintain categories. As described above, the present invention accomplishes these goals through the dynamic user-defined category feature, process diagrams of which are shown in FIGS. 27 and 27A.

Figure 27:
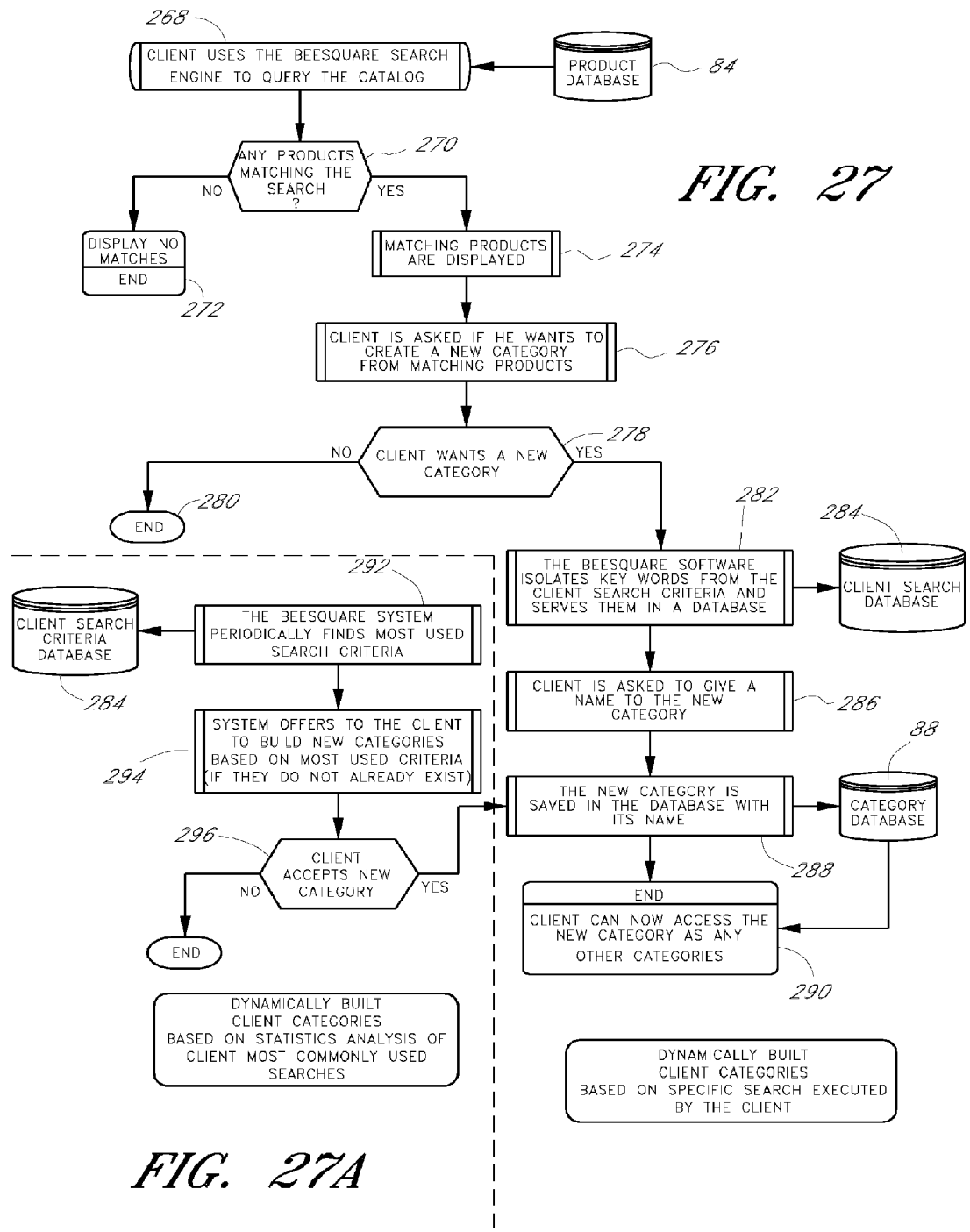

In one embodiment of the dynamic user-defined category feature, shown in FIG. 27, the dynamically-built categories are based on a specific search executed by the customer 72. In the first step 268 of this process, the customer 72 utilizes the customer application's search engine to query the product database, 84. If no products match the search criteria 270 the customer application 51 does not create categories and displays no matches for the search 272. At this point the process ends. If, on the other hand, the customer application 51 finds products that match the search criteria, shown in block 270, the customer application 51 next performs the step 274 of displaying the matching products and subsequently querying the customer 72 whether a category should be created from the entered search criteria, shown in block 276. If the customer 72 does not elect to create a new category, a decision represented by block 278, the customer application 51 ends the process, represented by block 280.

If, on the other hand, the customer 72 does want to create a new category based on the entered search criteria, represented by block 278, the customer application 51 performs the step 282 of saving the customer's search criteria in the search criteria database 284 In an alternative implementation, the customer application might perform the optional step of isolating key words from the customer's search criteria and saving only those key words in the client search criteria database 284, in order to conserve space in the search criteria database or promote more efficient searching, for example. The customer application 51 next performs the step 286 of prompting the user to name for the new category. Finally, the customer application 51 performs the step 288 of saving the new category in the category database 88, using the name provided in block 286. At this point 290, the customer 72 can now access the new category by name, as the user would access any other category.

An additional feature of the present invention is the facility to create categories based not only on a specific query, but based also on a composite of substantially identical queries commonly used by a particular customer. To implement this feature, the customer application 51 keeps a log of recent queries for each customer 72. Periodically, the customer application 51 will compare recent queries by the same customer 72 to find query resubmission events, which are multiple instances of the same or substantially similar queries by the same customer 72. Upon finding such query resubmission events, the customer application will automatically create and save a category embodying the commonly-used query, optionally with customer 72 confirmation. The queries may be compared by comparing the queries themselves (e.g., term-by-term), by comparing the results of such queries, or through both methods. The customer application 51 may require some threshold number of resubmission events (e.g., 15) before creating a category for the customer.

This feature of the invention could also be used to assist the merchant in defining public categories. For example, the queries of all customers of a particular merchant could be compared to identify and generate categories for the most popular searches.

A block diagram of this feature is shown in FIG. 27A. This feature is based on a statistical analysis of the most commonly used searches by the customer 72. Under this process, the customer application 51 first searches the client search criteria database 284 for the most used search criteria, a step represented by block 292. The system next performs the step 294 of offering to the customer 72 the option to build one or more new categories based on the most frequently used criteria, assuming such categories do not already exist. If the customer 72 does not accept the new category, a decision represented by step 296, the customer application 51 ends the process. If, on the other hand, the client does accept the new category in the decision represented by block 296, the system performs the step 288 of saving the new category in the category database 88, with a name chosen by the customer 72 (step not shown). Once again, at this point 290, the customer 72 can now access this category as with any other category. Although the implementation described here details the process the customer application 51 uses to create dynamic, user-defined categories, the merchant application 53 could provide the same functionality to the merchant 74, as described and shown in FIGS. 19-24, above.

Figure 28:
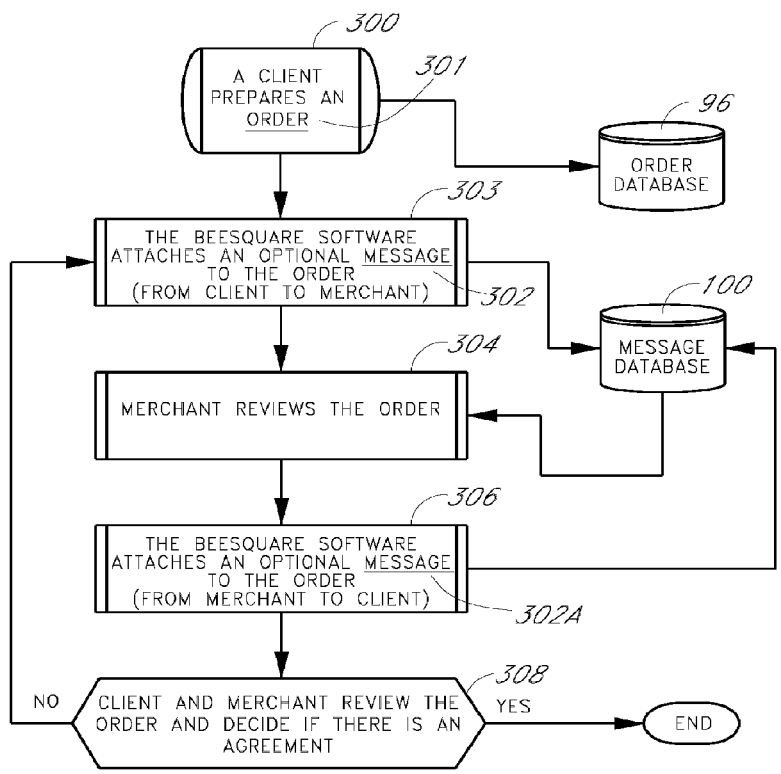
FIG. 28 shows a process flow diagram of a message audit trail feature for an electronic commerce application.

FIG. 28 is a process diagram depicting the above-described message audit trail feature of the present invention. The first step 300 in the message audit trail feature is the creation of an order 301 by the client or customer 72, during which the customer enters an optional message. The order 301 is then stored in the order database 96. The customer application 51 then next attaches the message 302 to the order 301 in the step denoted by block 303. The message 302 is stored in the message database 100 and is linked to the order 301, which remains stored in the order database 96. Next, the merchant 74 reviews the order 301 as shown in block 304. If a message 302 was in fact attached to the order 301 in step 303, that message is retrieved from the message database 100 through its link to the order 301, and displayed in conjunction with the order. The merchant 74 then optionally creates another message 302A, associated with the order 301. Like the customer's message 302, the merchant's message 302A is stored in the message database 100 and linked to the order 301 stored in the order database 96. At the final step of the process 308, the customer 72 and merchant 74 review the order 301 and attached messages 302 and 302A to decide if there is agreement between the two parties. If so, the transaction is concluded and the process ends. If not, the process continues from step 303 where the customer 72 can attach another message 302 to the order, and the process executes another iteration. Although not shown in the drawing, it is possible for either the customer 72 or the merchant 74 to append a message to the order at any time during the pendency of the order. Additionally, one party may create two or more messages consecutively; the party need not wait for the other party to respond to the first message before creating subsequent messages.

Figure 29:
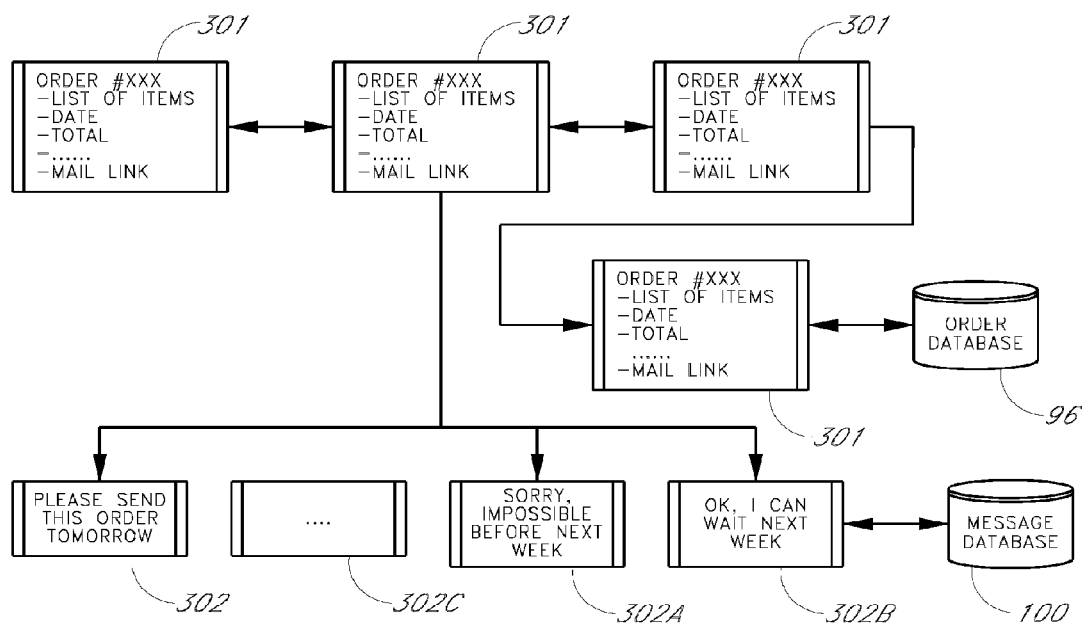
FIG. 29 shows a schematic view of the databases involved in the message audit trail feature.

FIG. 29 shows a schematic view of the databases involved in the message audit trail feature. The order 301 is stored in the order database 96 and the messages attached to the order 302, 302A, 302B, 302C are stored in the message database 100. In addition, the stored messages 302, 302A, 302B, 302C in the message database 10 are linked to the stored order 301 in the order database 96, in order to enable the customer application 51 and merchant application 52 to provide a linked message audit trail of all messages 302, 302A, 302B, 302C associated with a particular order 301. In the preferred implementation, when the message is stored in the message database 100, a link to the associated order 301 in the order database 96 is stored as part of the message record.

Although this invention has been described in terms of certain preferred embodiments, other embodiments that are apparent to those of ordinary skill in the art are also within the scope of this invention, including embodiments that provide some, but not all of the benefits and features described herein. Accordingly, the scope of the present invention is intended to be defined only by reference to the appended claims.

What is claimed is:

1. A system comprising:
   one or more computing devices configured to:
   generate a first browser interface through which buyers place orders, the first browser interface including a first portion for displaying at least a subset of the negotiated terms between a buyer and merchant for a particular order and a second portion including:

a message field for a buyer to generate, and submit to the merchant, messages that are linked to particular orders, and a display of at least a subset of a record of messages previously exchanged between the buyer and the merchant linked to the particular order; and generate a second user interface through which the merchant views the orders, including a first portion for displaying at least a subset of the negotiated terms between a buyer and merchant for a particular order and a second portion including:

a terms field for a merchant to generate, and submit to the buyer, terms that are linked to particular orders, and a display of at least a subset of a record of terms previously exchanged between the buyer and the merchant linked to the particular order.

2. The system of claim 1, wherein the first and second user interfaces are linked to a common order database that stores both the negotiated terms and messages related to a particular order.

3. The system of claim 1, wherein the first and second user interfaces permit the buyers and merchants respectively to associate at least one or more messages with at least one or more negotiated terms.

4. The system of claim 1, wherein the first and second interfaces comprise web pages served by a common host site.

5. The system of claim 1, wherein the first and second user interfaces each provide a link that is selectable to view the history of the messages between merchant and buyer.

6. The system of claim 1, wherein the first and second user interfaces provide for communications between the merchant and the buyer without use of electronic mail.

7. The system of claim 1, wherein the second user interface provides functionality for the merchant to modify the order in response to a message from a buyer.

8. A computer-implemented method for facilitating communication between buyers and merchants, the computer-implemented method comprising:

as implemented by one or more computing devices configured with specific executable instructions, generating a first browser interface through which buyers place orders, the first browser interface including a first portion for displaying at least a subset of the negotiated terms between a buyer and merchant for a particular order and a second portion including:

a message field for a buyer to generate, and submit to the merchant, messages that are linked to the particular order, and a display of at least a subset of a record of messages previously exchanged between the buyer and the merchant linked to the particular order; and generating a second user interface through which the merchant views the orders, including a first portion for displaying at least a subset of the negotiated terms between a buyer and merchant for a particular order and a second portion including:

a terms field for a merchant to generate, and submit to the buyer, terms that are linked to particular orders, and a display of at least a subset of a record of terms previously exchanged between the buyer and the merchant linked to the particular order.

9. The method of claim 8 further comprising linking the first and second user interfaces a common order database, wherein the common order database stores both the negotiated terms and messages related to the particular order.

10. The method of claim 8, wherein the first and second user interfaces permit the buyers and merchants respectively to associate at least one or more messages with at least one or more negotiated terms.

11. The method of claim 8, wherein the first and second interfaces comprise web pages served by a common host site.

12. The method of claim 8, wherein the first and second user interfaces each provide a link that is selectable to view the history of the messages between merchant and buyer.

13. The method of claim 8, wherein the first and second user interfaces provide for communications between the merchant and the buyer without use of electronic mail.

14. The method of claim 8, wherein the second user interface provides functionality for the merchant to modify the order in response to a message from a buyer.

\* \* \* \* \*